(12) United States Patent
Halstead et al.

(10) Patent No.: US 11,423,036 B2
(45) Date of Patent: Aug. 23, 2022

(54) SYSTEMS AND METHODS FOR SELECTING DATASETS

(71) Applicant: Infosum Limited, Basingstoke (GB)

(72) Inventors: Nicholas Halstead, Hook Hampshire (GB); Eike Spang, Basingstoke (GB)

(73) Assignee: INFOSUM LIMITED, Basingstoke (GB)

( * ) Notice: Subject to any disclaimer, the term of this patent is extended or adjusted under 35 U.S.C. 154(b) by 0 days.

(21) Appl. No.: 16/638,227

(22) PCT Filed: Aug. 10, 2018

(86) PCT No.: PCT/EP2018/071827
§ 371 (c)(1),
(2) Date: Feb. 11, 2020

(87) PCT Pub. No.: WO2019/030407
PCT Pub. Date: Feb. 14, 2019

(65) Prior Publication Data
US 2020/0278977 A1    Sep. 3, 2020

(30) Foreign Application Priority Data

Aug. 11, 2017 (GB) .................................... 1712951

(51) Int. Cl.
*G06F 16/28* (2019.01)
*G06F 16/2457* (2019.01)
*G06F 16/248* (2019.01)

(52) U.S. Cl.
CPC ...... *G06F 16/24578* (2019.01); *G06F 16/248* (2019.01); *G06F 16/285* (2019.01)

(58) Field of Classification Search
CPC . G06F 16/24578; G06F 16/285; G06F 16/248
See application file for complete search history.

(56) References Cited

U.S. PATENT DOCUMENTS

| | | |
|---|---|---|
| 2015/0242407 A1 | 8/2015 | Frohock et al. |
| 2016/0055212 A1 | 2/2016 | Young et al. |
| 2017/0212953 A1* | 7/2017 | Oberhofer ............. G06F 16/285 |

OTHER PUBLICATIONS

Vatsalan et al., "Privacy-preserving matching of similar patients," Journal of biomedical informatics 59 (2016): 285-298. (Year: 2016).*

* cited by examiner

*Primary Examiner* — Jay A Morrison
(74) *Attorney, Agent, or Firm* — BainwoodHuang

(57) ABSTRACT

A method of determining a further dataset to be joined with a source dataset having a plurality of data entries each identified by a respective key. An identifier of the source dataset is received, and an intersection weight between the source dataset and each of a plurality of possible further datasets is determined based on the number of common keys between the source dataset and each respective possible further dataset. An output is then generated based on the intersection weights for use in selecting one of the plurality of possible further datasets to be joined with the source dataset.

14 Claims, 16 Drawing Sheets

```
columns:
  hashed_pid: BYTES
  debt: UINT64
  storecard_balance: INT64
  credit_score: DOUBLE
  have_life_insurance: BOOLEAN
  number_of_credit_cards: UINT64
  address_1: TEXT
  address_2: TEXT
  address_3: TEXT
  post_code: TEXT
keys:
  - hashed_pid
credentials:
  user: dev
  password: dev
  database: database1
  address: 192.168.1.130:3306
redaction_threshold: 1000
bin_redaction_threshold: 100
max_database_connections: 151
store: mysql
executors: 4
```
~56

FIG. 7a

| | Source data source: | My Clients | | | | |
|---|---|---|---|---|---|---|
| | Filter Category: | Ad Tech | | | | |
| | Filter Tags: | - | | | | |
| | Minimum Intersection: | 20% | | | | |

| | Name | Category | Tags | #rows | Common Rows | Common Fields | Last Updated |
|---|---|---|---|---|---|---|---|
| 141 | ACME Medical | Health | Health \| IOT | 1,000,000 | ▨ | ▨ | 2 Jan 2017 |
| 142 | Ad Tech Inc. | Ad-Tech | Ads \| Tracking \| Consumer | 1,000,301 | ▨ | ▨ | 21 Dec 2016 |
| 143 | Supermarket A | Retail | Retail \| Rewards \| Consumer \| UK | 2,320,995 | ▨ | | 14 Nov 2016 |
| 144 | Royal Insurance | Insurance | Business \| Global | 4,322,704 | ▨ | ▨ | 12 Nov 2016 |
| 145 | DVLA | Government | Government \| UK | 31,182,741 | ▨ | ▨ | 19 Dec 2016 |
| 146 | 2011 Census | Government | Government \| Census \| UK | 43,231,098 | | ▨ | 1 Jan 2012 |
| 147 | Big Bank | Banking | Finance \| Europe | 61,871,880 | ▨ | ▨ | 17 Jan 2017 |
| 148 | One Wall | Banking | Medecine \| Global \| Clinical | 81,781,321 | ▨ | ▨ | 17 Jan 2017 |
| 149 | CDC Cause of Death | Health | Medecine \| USA \| Death \| Disease | 11,361,345 | | ▨ | 27 March 2016 |

FIG. 14

SYSTEMS AND METHODS FOR SELECTING DATASETS

FIELD

The present invention relates to accessing multiple databases.

BACKGROUND

It has long been the case that it has been possible to query databases holding data to provide a response to the query. Queries are run on databases to find a match for the information being requested responsive to the query. For example, a user providing the query might want to know how many entries in a particular database satisfy a particular requirement, for example, an age range or gender requirement. There are numerous technologies available to handle this. It is becoming an increasing requirement however to use more than one dataset to satisfy a single query.

According to one technique, the two independent datasets are firstly merged together so that they exist as a single dataset which can then be queried with the multiple expressions. This procedure can require the transfer of large amounts of data, and a complex merging exercise at the receiving end.

Sometimes, databases are available within a single "system" such that they can be in direct communication. A technique exists to query across such databases. For this technique you have to give full read access to the databases to allow those queries. So there is no way of controlling the queries that are made on individual databases and therefore there is no way to keep the data secure. This is why the technique is only suitable for databases which are held on the same "system". The technique is not suitable for databases held by independent owners.

Thus, in one known arrangement, data is collected into a single database. This puts limitations on how the data can be joined and analysed. In another technique, data is moved either physically or over the Internet, exposing it to a variety of security risks.

Further disadvantages of the known techniques include the fact that data quickly becomes less valuable and useful as it goes out of date. This means that where data is collected into a single database from multiple independent databases, this has to be an ongoing procedure. Increasingly, privacy restrictions surrounding data means that providing data from one database into a combined database can come with restrictions around privacy issues.

In any case, a proprietor of a database may wish to join his database with that of another party, or to at least run a query over both databases.

SUMMARY

In many cases, it can be advantageous for a user to have an idea of the intersection between two datasets—in particular the intersection between his own dataset and that of a third party. For example, a user's dataset may comprise medical data on one million people, and a second dataset may comprise financial records for two million people. The user may wish to know how many of the people for whom he has medical data are also to be found in the second dataset, because this means that the financial and medical data can, for these people, be correlated.

According to one aspect of the invention there is provided a method of determining a further dataset to be joined with a source dataset comprising a plurality of data entries each identified by a respective key, the method comprising: receiving an identifier of the source dataset; determining an intersection weight between the source dataset and each of a plurality of possible further datasets based on the number of common keys between the source dataset and each respective possible further dataset and generating an output based on the intersection weights for use in selecting, one of the plurality of possible further datasets to be joined with the source dataset.

In a preferred embodiment, the output which is generated for use in selecting one of the plurality a possible further dataset causes data to be presented to the user via graphical user interlace. While this could be done by audio, the preferred technique is to provide clear visual information about the possible further datasets on the GUI. This information can include the intersection weights themselves and/or the datasets can be presented to the user on the GUI ranked according to their intersection weights with the source dataset. This provides a very simple visual 'marketplace' from which a user can readily envisage which dataset or datasets would be most beneficial to be combined with his own. This is particularly useful in the context of running a query over joint datasets.

The intersection weights can be determined by accessing a data structure which holds, for each pair of possible further dataset and the source dataset, a pre-calculated intersection weight. That is, the intersection weights can be calculated ahead of time and made readily available such that the intersection weight between the source dataset identified (for example by a user) with any of the other possible further datasets. As an alternative, the intersection can be determined by accessing for each of the plurality of datasets, data indicative of a set of keys comprised in the respective dataset. These data can be used to calculate the intersection weight from the sets of keys. The data of the indicative of the sets of keys comprising the respective datasets can be a respective bloom filter generated from the keys comprised in the respective dataset. The step of determining the intersection weight for a given possible further dataset with the source dataset may then be performed by generating a source bloom filter from keys comprising the source dataset and comparing the source bloom filter with respective bloom filter of that given possible further dataset. Another structure which could be used to determine intersection is a set of hyperloglog registers representing each dataset.

The method can include a step of selecting one or more possible further datasets. This can be done by receiving user input, and selecting one of the datasets, based on the intersection weights. Alternatively, the method can comprise a step of automatically selecting the possible further dataset which has the highest respective intersection weight with the source dataset. This can be done by an autonomous agent, for example through an API, and does not need to involve the intervention of a user. However, manual selection by user is also considered to be a useful embodiment of the present invention. To assist him, the user is presented with clear visual information of the datasets, ranked according to intersection weight with his own, source dataset.

The method may further comprise receiving a filtering category and selecting from the plurality of possible further datasets at least one dataset having data entries of the category which matches the filtering category. In that case, the determining of the intersection weights may be restricted only to the subset of datasets which match the filtering category. The filtering category may be received from the user, or it may be received from an autonomous agent which supplied the query to be run over the datasets.

After a possible further dataset has been selected, the method can further comprise applying a query to the source dataset in the at least one selected possible further dataset. This is a context in which these aspects of the present invention are particularly advantageous, because they allow a preferred pair of datasets to be joined for the purpose of running a query.

The identifier of the source dataset can be received from a human user, and the step of selecting (based on the generated output) can be carried out by the human user. Alternatively, the identifier of the source dataset may be received from the human user, but the step of selecting can be carried out automatically without input from the user. As a further alternative, the identifier of the source dataset can be received from an autonomous agent which also supplies the query. In that case the step of selecting may also be carried out automatically, by the autonomous agent or based on information from the autonomous agent.

It is possible in some situations that the dataset stores entries identified by a key of the first type, but possible further datasets store entries identified by a key the second type, and not of the first type. In this case, the intersection weight between the source dataset and at least one of the plurality of further dataset can be determined using an intermediate dataset which converts the key of the first type to a key of the second type. This can be referred to as an intermediate mapping entity.

Another aspect of the invention provides a computer program product comprising computer code which when executed by computer carries out a method according to any of the preceding definitions.

A further aspect of the invention provides a computer system for identifying datasets to be joined, the computer system comprising: an input for receiving an identifier of a source dataset; a processor configured to execute a computer program which determines an intersection weight between the source dataset and each of a plurality of possible further datasets based on a number of common keys between the source dataset and each respective possible further dataset; and an output for providing an output signal based on the intersection weights for use in selecting one of the plurality of possible further datasets to be joined with the source dataset.

The computer system can include a display for presenting possible further datasets to a user, whereby a user can generate a selection input of the further dataset to be joined with the source dataset. Preferably the display shows the possible further dataset or datasets ranked by intersection weight with source dataset.

The computer system can further comprise an API for providing the output signal to an autonomous agent configured to generate a selection input of the further dataset to be joined with the source dataset.

The computer system can further comprise a user input to enable a user to input a filtering category, when the computer program is programmed to select from the plurality of possible further datasets a subset having data entries of a category which matches the filtering category.

Embodiments of the invention described in the following facilitate running a query over more than one dataset, and in particular facilitate user choice as to over which datasets a query should be run.

When a query is run over two or more datasets, the amount of additional useful information resulting (when compared with one dataset) from the query will depend on how much "overlap" there is between the two datasets. That is, to enhance the results, the query should be able to run against matching entries in both datasets, e.g. an entry in a first dataset matches an entry in a second dataset if they can be identified as relating to the same entity, for example the same person. That can be done by, for example, a matching "name" field for a data entry, or another identifier which is the same for both entries. For the reasons given above by way of background, at present it is difficult to "join" datasets, and furthermore users may be restricted for one reason or another to the datasets available to them. Applicants' earlier patent application GB1620010.7 describes a way of more readily joining datasets, which enables, in principle, any two or more datasets to be joined by a common query. When a user has a choice of different datasets to join, he may prefer to join dataset pairs which have the larger overlap.

A scenario enabled herein is for a user to join his own dataset with one or more "foreign" datasets—i.e. datasets outside his control. In this context, the user can choose the "foreign" dataset with the largest overlap to his own.

The present invention recognises, however, that this is not always the case because there may be other factors in the user's decision. For example, the dataset with the largest overlap with the user's may charge a fee for access.

The techniques described herein can be used in a number of different scenarios. Interaction weights can be used to display a ranked ordering of destination databases to join with a source database, from which a user may select. Alternatively, an autonomous agent can use the intersection weights to automatically select a database to join with a source database to run a query or an API (Application Programming Interface) could remotely access the intersection weights for use at a different location.

In another scenario, a user may not control his own dataset, but may nevertheless be interested in running a query over multiple datasets holding different data.

Embodiments of the invention described herein enable a service to help the user choose, ahead of time, one (or more) datasets with which to perform a joining with another dataset (or at least over which to run a query). The querying entity could be a human user, who may be interested in joining another dataset to his to his own dataset. Alternatively, the querying entity may be a computer who can automatically determine the best pairs of databases over which to run a query.

The term "dataset" is used herein to refer to any set of data, whether stored on a single memory device (e.g. a server) or across multiple memory devices (e.g. multiple servers). Similarly, the term "database" is used to refer to a data construct comprising multiple data entries, which may be stored at one or more memory locations (potentially at different geographical locations such as different data centres). In the art, the term "database" implies a structured ordering of the data wherein fields are held in association with identifiers (generally in rows and columns, but also possibly as other representations such as graphs, time series etc.). Other datasets are possible, which do not necessarily conform to a database paradigm. The term "database" may be used herein to denote a database or a dataset.

The intersection weights are easily accessible and can be used to provide a user with insight into possible (probable) value of particular combinations of datasets for the purposes of joining and/or querying—before the user even begins the joining/querying. This can be done by visually presenting information relating to at least some of the intersection weights to a user, e.g. on a graphical display, though other means of providing the user with this information are not excluded (e.g. via audio). In particular, indications of the pairs of databases may be displayed and may be ranked by their respective intersection weight, such that the user may easily see which pairs have greater intersections and which have fewer (pairs having an intersection weight below a threshold value or percentile may even be omitted).

In embodiments, the method further comprises a step of receiving an identifier of a user database, and a step of adding the identifier to a data structure with its intersection weight based on the number of overlapping entries between the user database and each of the plurality of databases.

This is particularly advantageous because the user can then be presented with information pertaining specifically to database which comprise his own database. E.g. a ranked listed of other databases ordered by their amount of overlap with the user's database. Embodiments of the present invention enable another the determination of the intersection data to be performed in a computationally quick manner, which means the user can be presented with a large amount of potentially valuable information in a short amount of time (following his request for the information).

For a better understanding of the present invention and to show how the same may be carried into effect, reference will now be made by way of example to the following drawings.

BRIEF DESCRIPTION OF DRAWINGS

FIG. 7*a* is an example of the configuration file as illustrated in FIG. 7;

FIG. 14 illustrates an example representation of intersection data to a user;

DETAILED DESCRIPTION

Figure 1:
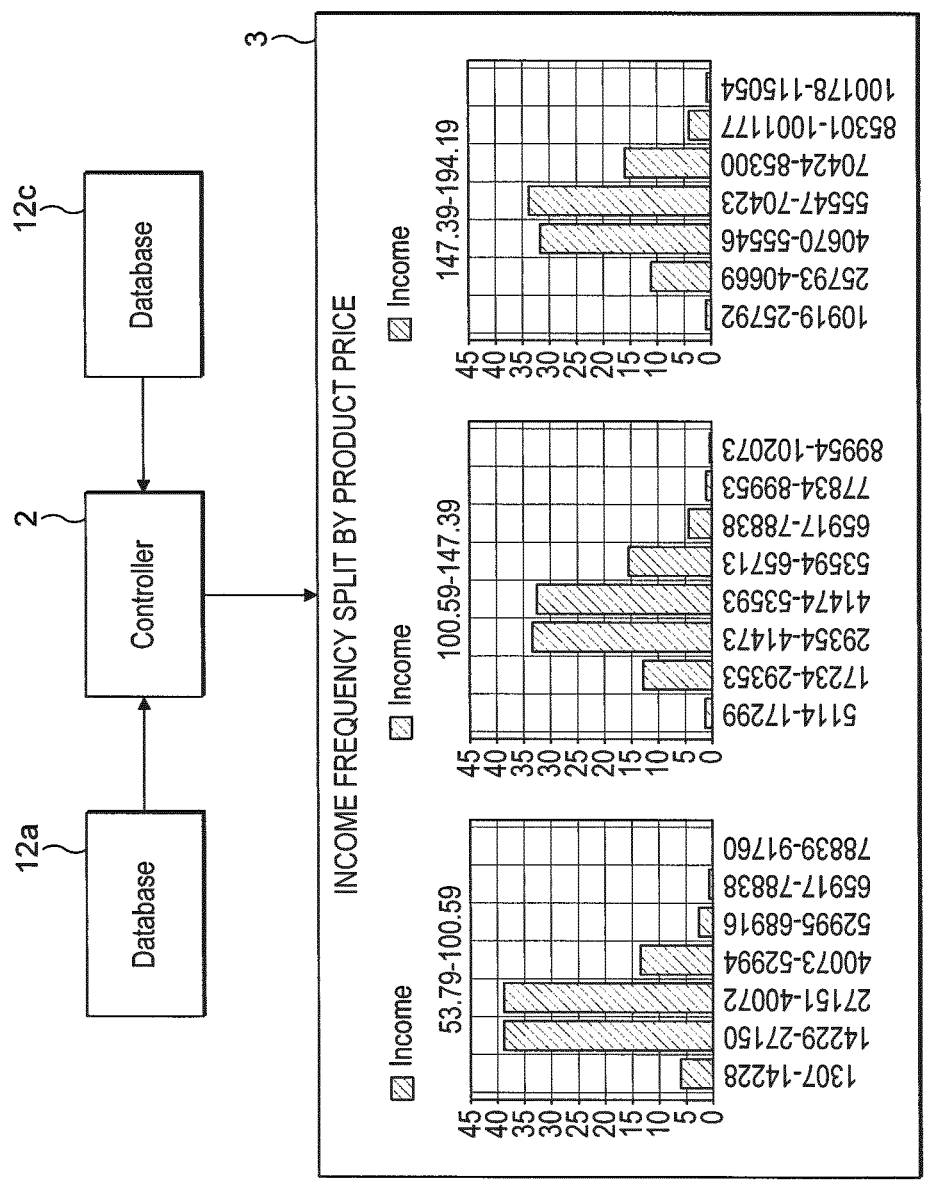
FIG. 1 is a schematic diagram illustrating a data joining system at a high schematic level.

Nowadays every company holds valuable data, for example concerning attributes of consumers or potential consumers who may wish to access that data. Sharing customer data among different companies creates complex privacy and legal issues, as the data contained in customer records may be shared involuntarily. The problem is exacerbated by the fact that different departments within the same company, or among different companies may store data at different locations, and thus moving and selling data across sites poses security risks that may result in value leakage.

Furthermore, different companies' storage formats are often not compatible and therefore increases the complexity in sharing customer data.

There are a very large number of companies holding such databases, and our previous application GB1620010.7 filed 25 Nov. 2016 provides a means by which a proprietor (user, or manager) of a user database may choose one or more of these databases to join with his own or to query over. In this case, the user may have to make a decision regarding which other database(s) with which he joins his user database (or runs a query over) in order to extract useful knowledge. Given the large number of other databases, this may be a daunting task. Hence, the present invention also provides systems and methods to address this issue, by creating a data structure holding, for each pair of databases, an intersection weight based on the number of overlapping entries of the pair. This data structure then allows the user to determine, ahead of time (i.e. before actually performing the joining or querying), various metrics which assist him in deciding which database(s) to use. This is described in more detail below, following an outline of database joining and querying in general.

As mentioned, techniques for joining and querying multiple databases are useful for extracting knowledge from data residing in two (or more) different databases. This means that a user (or a user database) generally has a choice, given the large number of existing databases, of which databases to join to his own. The present invention recognises the user's desire to make an optimal choice in this regard, and that the factors which govern this "optimal" choice may be different for different users.

To address this, a number of overlapping entries between each of a plurality of dataset pairs is determined and stored in a data structure as an intersection weight indicative of the number of overlapping entries for each pair. That is, this novel data structure then stores information relating to the amount of overlap (intersection) between the user's database and possible further databases to be joined. The data structure can then be accessed in order to present to the user information about the overlaps which may assist in his decision. The user may then optionally select one or more of the plurality of databases, and a querying may be performed on these selected further databases, joined to the user's own database.

That is, embodiments of the present invention described herein relate to methods which may be divided broadly into three main stages:

(A) determination of the intersection values and optionally creation of a data structure to hold them;
(B) presenting a user with information relating to some or all of the intersection values to allow the user to select one or more databases; and
(C) performing a database joining or querying operation on the selected one or more databases (and the user's own database).

Stage C is performed by a processor 42 which controls joining as described in more detail below. Stage A may also be performed by processor 42, but may alternatively be implemented by a different processor dedicated to generating and managing the data structure itself. This may particularly advantageously be a centralised processor in, e.g. a server, of a service provider as this allows for central maintenance and provisioning of the knowledge embodied in the data structure. That is, client devices (e.g. of users) can then access the data structure from this central location.

Stage B is performed by a user interface such as a Graphical User Interface (GUI) which presents the information to the user. The GUI is connected to the processor 42 (and the other processor in embodiment where a different processor performs stage A). The GUI is configured to receive user input relating to various user preferences such as an indication of the user's database of which he wishes to view intersection data. The GUI is then also configured to display information pertaining to these intersections to the user (as described in more detail below in relation to FIG. 14), and to receive further user input relating to a selection of one or more databases or database pairs. The GUI then provides an instruction to the processor 42 such that the processor 42 can perform stage C in relation to the selected databases.

The simplest way to calculate intersection weights for each database pair is to access both databases to inspect the entries and look for matches, but this may be slow and is insecure. A quicker way of doing this is to retrieve a set of keys from the first database (e.g. IDs, or names of each data entry) and provide the keys to the second database to determine if any entries in the second database have a matching key. This is still insecure however, and a further improvement is to first hash the keys and to compare these with keys of entries in the second database hashed with the same hashing algorithm.

Even this method may not be optimal as hash algorithms are (potentially) reversible, particularly "fast" hash algorithms known in the art. The use of cryptographic hash algorithms addresses this problem somewhat, but an even further improvement is to generate a bloom filter from keys in the first database. The bloom filter can then be applied to each entry in the second database in order to determine which entries in the second database are definitely not in the first, hence giving an indication of the amount of (potential) overlap. A slightly different version of this method is to generate a respective bloom filter for each database and to compare the resulting bloom filters.

A bloom filter is a bit string of length n onto which has been encoded information about a set of data values. The (n) bits of the bloom filter are all initialised to 0. A data value is encoded onto the filter by applying a set of k hash functions to the data value which each return (modulo n, if the algorithm allows for results greater than k) a respective integer between 1 and n (that is, the data value is transformed into a set of k integers) which are then interpreted as positions within the bit string. The bits at these (k) positions are then re-written to 1. Further data values can be written to the (same) bit string using the same method. If one or more of the hash functions, when writing a further data value, points to a bit in the filter which is already 1 (i.e. written to encode some earlier data value), it remains a 1 after writing the further data value.

The bloom filter, once written, allows for the quick determination that a test data value is not a member of the original (encoding) set. To do so, the same k hashes are performed on the test value. If any of the bits in the string at those locations is a 0, the test value was not a member of the original set (otherwise this bit would have been rewritten as a 1). False positives, however, are possible because the k hashes of the test value could by chance point to locations in the string which were indeed written during encoding, but in the context of determining intersection of datasets, this does not significantly impact the usefulness of results.

In the case where bloom filters are compared, the two generated bloom filters must have the same length (i.e. the resulting filters need to comprise the same number of bits) and be generated using the same set of hash functions (same number of hashes, and the same algorithms themselves). The two bloom filters can be compared in a bitwise manner to determine estimates of set operations on the two initial sets (i.e. the databases from which the filters are generated being sets of data entries).

For example, the union of the two sets can be estimated by generating a "pseudo"-bloom filter being a bitwise-OR of the two initial bloom filters. Hence, when applying this filter to a test data entry, it will only return "false" (test data entry is not represented in the pseudo-bloom filter) if the test data entry was in neither of the initial two databases.

As another example, the intersection of the two sets can be estimated by generating a "pseudo"-bloom filter being a bitwise-AND of the initial bloom filters. Hence, when applying this filter to a test data entry, it will only return "false" (test data entry is not represented in the pseudo-bloom filter) if the test data entry was not in both of the initial two databases.

In both of the above examples, it is also possible to determine an error rate relating to the probability of false positives (or negatives) occurring. For example, the bitwise-AND (intersection) bloom filter may return "true" for a data entry which is, in fact, only in one initial database, with a mathematically determinable probability based on the bit-length of the filters and the number of hashes used. An indication of this error rate may be displayed to the user via the GUI. Further, the user may be able to input a preference maximum error rate (a threshold value), and the system may then only display intersections having an error rate less than this preference value. In other words, those of the intersections with unacceptably high (according to the user) error rates can be filtered out of the displayed intersection data.

Another example of a data structure is the result of a hyperloglog algorithm applied to the data sets. A hash function is applied to each data entry of a dataset to obtain a set of hashes which are assumed to be uniformly distributed random numbers. The set is divided into smaller subsets (each of which may be stored in a register), and the maximum number of leading zeroes is calculated in each subset. This gives an estimate of the cardinality of each subset according to the hyperloglog theory that if the maximum number of leading zeros is n, an estimate for the number of distinct elements in the set is 2 to the power n. By merging the subsets of multiple data sets, an indication of the intersection can be provided.

In any case, the intersection value determination performed in stage A comprises determining an indication of how many data entries in a first database can be identified as matching with a data entry in a second database. This is explained with reference to FIG. 15.

Figure 15:
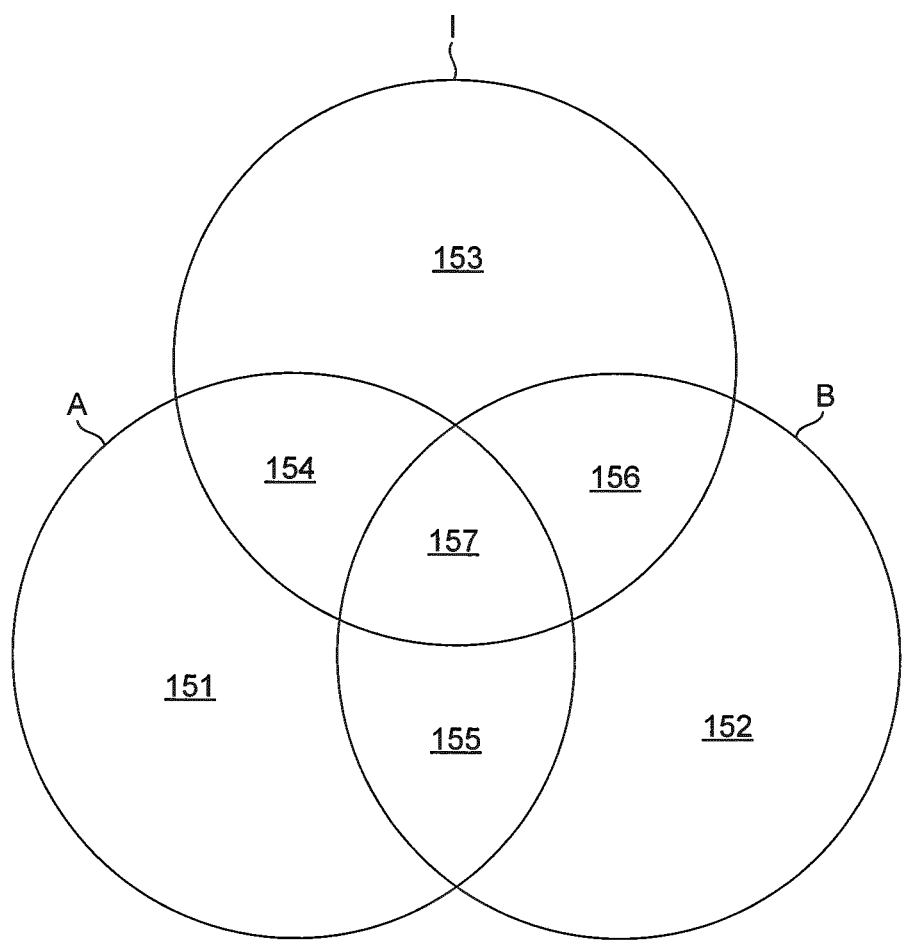
FIG. 15 is a Venn Diagram visually representing an example of dataset intersection.

FIG. 15 shows, diagrammatically (as a Venn Diagram), the first database A and the second database B, along with an "intermediate database" I, all of which are one of the databases 12a-c described in more detail below. Each database is represented by a circle A, B, I, with the data entries for that database lying within that circle.

There is a difference between a "key" and an "entry" in a database. An "entry" (or "data entry") is a particular instance of a vector of values in a database. For example, a data entry in the first database might identify a person by name and age.

A data entry in the second database might contain an entry (e.g. having an email address and a salary) which appears to be different (as it does not share any values with the first) but, in reality, does refer to the same person. That is, the name, age, email address, and salary are all values relating to the same (physical) person, just stored in different databases. A "key", on the other hand, is a value which allows the person (in this example) to be identified across both databases. In this example, the two data entries do not share any keys. However, it will be possible to aggregate these data values (i.e. to identify the fact that they relate to the same person) if a third database (e.g. intermediate database I) is available to provide a "key conversion". For example, if database I stores a data entry having the name and the email address associated with each other, then this can be used to "connect" the two different data entries.

In FIG. 15, each point in space represents a person (though it is appreciated that each person is just an example of a real-world "entity" and that this applies equally to other entities, such as businesses, institutions etc.). Information pertaining to people in regions 151, 154, 155 and 157 is stored as data entries in database A. Information pertaining to people in regions 152, 155, 156 and 157 is stored as data entries in database B. Information pertaining to people in regions 153, 154, 156 and 157 is stored as data entries in database I.

The task, in Stage A, is to determine (at least an estimate of) the number of people in regions 155 and 157 (i.e. the number of people which have some information about them stored in both database A and database B). If these databases share at least one key (e.g. they both store the email address of the person), then this can be done directly. If they do not, as in the above example, an Intermediate Database (database I) can be used to perform a key conversion.

There may be some people which are indeed present in both database A and database B but for which no key conversion is possible (because the intermediate database I does not have the necessary link between the first type of key and the second type of key, e.g. an association between name and email address). These people are represented by region 155.

People in region 157, on the other hand, can be identified as belonging to both database A and database B, because the intermediate database I does have such information allowing key conversion. Hence, the number of people in this region 157 can be determined.

FIG. 14 illustrates an example in which there are an exemplary ten databases (a user database and nine others 141-149). The overlaps between each of these databases have been pre-characterised and stored in the data structure, as mentioned above.

The user may select his database via an input portion 150 (e.g. via a reference to the database, if already accessible to the system, or via providing the data directly such as by uploading his database).

The data structure is then accessed in order to determine data relating to each of the nine databases 141-149 (e.g. name, category, tags, number of rows, age etc.), and to determine the number of overlapping entries between each pair formed of the user database and one of the nine databases 141-149 (e.g. number of common rows, number of common fields etc.). This can be done by generating, for each key in the user database, a respective bloom filter, and sending them to each of the databases 141-149 to be applied to any and all data entries contained in that database having a matching key. That is, if the user database comprises data entries having two keys, K1 and K2, then two bloom filters are generated, BF_K1 and BF_K2. Both BF_K1 and BF_K2 are sent to each of databases 141-149, and the respective drone 50 of each database 141-149 applies BF_K1 if the database comprises entries identified by key K1 and BF_K2 if the database comprises entries identified by key K2. This method does not scale well, however, and a better method is described below.

Instead of the above, bloom filters for each key used in each database 141-149 are generated and pre-stored in the data structure. For example, if database A (being of the databases 141-149) uses key K1 and database B (being a different one of the databases 141-149) uses both key K1 and K2, then the data structure will store: a bloom filter of entries in A using K1, BF_A_K1; a bloom filter for entries in B using K1, BF_B_K1; and a bloom filter for entries in B using K2, BF_B_K2.

In this example, to determine intersection weights between the pairs "user database and A", and "user database and B", bloom filters are generated from the user database for each of K1 and K2 and compared with every bloom filter in the data structure having a matching key type. This means, in this example, the user database bloom filter generated from K1 is compared with BF_A_K1 and BF_B_K1 and the user database bloom filter generated from K2 is compared with BF_B_K2 only. This comparison can be performed as described above (e.g. intersection determination as a bitwise-AND operation).

The data structure is then preferably updated to include the bloom filters (or hyperloglog stores) which were generated with respect to the user's dataset, meaning that when a request for intersection data relative to another dataset from a further user is received, the data structure can be accessed to determine (in a similar manner to the above) intersection data including intersections with the user database. In other words, the data structure then further comprises a bloom filter generated from the user database for each of K1 and K2, for use in future requests for intersection data.

The steps of adding the (new) bloom filters (generated from the user database) may be performed upon adding the user database to the system—see "drone registration" below.

These data are then presented to the user, e.g. via a graphical display as shown in FIG. 14. It is appreciated that other ways of presenting these data may be used, and that a simple table is used in FIG. 14 for the purposes of explanation. Additionally, a greater or fewer number of columns may be present relating to various different metrics and pieces of information about each of the databases. In general, the only column which is requires is one indicating to the user the amount of overlap between his user database and a particular one of the other databases 141-149, such as "common rows" and or "common fields". Both of these may be presented, as shown in FIG. 14. Further, the entries in one or more of these columns may be present in a pseudonymised manner, such as a hash. This is particularly appropriate for example for the "name" column if a respective proprietor of those one or more databases does not want the name of their database published.

The overlap value "common rows" indicates a number (or percentage as shown in FIG. 14) of entries in the user database the keys for which match keys of data entries in the other database. When represented as a percentage, this can be (as shown in FIG. 14) this number as a percentage of the total number of entries in the user database.

The overlap value "common fields" indicates the number of fields of the user database which are also present in the other database. Fields are pieces of data associated with each individual data entry, e.g. "salary", "age range", "town of residence", "region of residence" etc. This may also be represented as a percentage of the total number of fields in the user database.

The databases 141-149 may be sorted (ordered) by any column but, particularly advantageously, the present invention allows sorting by intersection amount (e.g. common rows, common fields). Hence, the user is able to quickly determine which of the databases 141-149 have a greater intersection with his user database and make his choice accordingly. This may comprise choosing the database having the largest intersection. However, in some circumstances the user may not choose this database. For example, if the top database (having the most overlap) is old (has not been updated for a long time), the user may choose to use a different database which has less overlap but is more up-to-date. The present invention allows the user free choice in this regard, and does not presume any user preferences.

The ordering of the databases 141-149 by a field (e.g. by common rows) may be performed using any suitable sorting algorithm (e.g. quick sort) known in the art. This algorithm may be applied after one or more of the databases has been removed from the set to be displayed, e.g. because that database falls below a threshold value for the field by which they are sorted (such as not having a required minimum intersection), as described in more detail below.

To further facilitate the user's decision, the user may be able to filter which databases 141-149 are displayed, according to one or more criteria. As a first example, the user may specify that only databases of a particular category(s) are to be shown, such as "banking" only—which, in the example of FIG. 15, would mean only databases 147, 148 are shown. As a second example, the user may specify that only databases having greater (or fewer) entries than a threshold amount are to be shown, such as "more than 40,000,000 entries—which, in the example of FIG. 14 would mean only databases 146, 147, 148 are displayed. Hence, the user may be displayed with a "filtering input" portion 160 on the GUI, as shown in FIG. 14, which allows him to specify one or more filtering criteria by inputting them via the filtering portion by way of e.g. a text box of drop-down menu. The filtering input may be a filtering value for one or more of the fields (e.g. minimum common rows, minimum common fields etc.) or may be a filtering category for the resulting databases (e.g. a particular type of database such as "financial" or "medical"). Only databases meeting the filtering input are then displayed to the user (potentially ordered by a particular value chosen by the user, as described above), e.g. only databases exceeding the filtering value (or not exceeding, if the filtering value is a maximum value), and/or only databases being of the filtering category type. Note that in FIG. 14 the category "Ad Tech" has been chosen but not yet applied—once applied, only database 142 will be displayed as this is the only database which matches this category. As another example, also shown in FIG. 14, the user may specify one or more "tags" using the filtering portion 160, and then only databases with at least one tag matching the filtering tag are displayed. Note that in FIG. 14, no filtering tag has been chosen (and hence also not applied).

While the above has been described in terms of displaying the databases 141-149 and respective intersection data to the user in order that the user may make a decision about which database he wishes to use, this step may also be automated. That is, a default one of the databases 141-149 may be automatically selected. However, the conditions for deciding which database is used by default may still be set by the user. For example, the user could specify that the database with the largest number of common rows is to be used each time, and then the system can simply automatically select that one of the databases 141-149 following the determining of the intersection weights, without needing to display these to the user. The step of setting the conditions may also be automated (e.g. the "top" database, having the largest intersection, could be used by default if the user has not specified any other condition). Note that the filtering options can still be applied in these cases. For example, the user could request an optimal one of the databases 141-149 in the "government category" in which case the system filters out the other databases, leaving only databases 145 and 146, and then selects database 146 as default based on a condition that the database with the highest number of common fields is to be chosen.

Even when two databases have no directly matching keys, it may be possible to join (or run a query over) these by "converting" keys of a first type in the first database to keys of a second type in the second database using an intermediate database. For example, if the first database stores data entries in association with "name" key (e.g. John Smith) and the second database stores data entries in association with "email" keys, an intermediate database specifying name-email pairs can be used to identify entries in the second database which match entries in the first database by first converting the name keys to email keys using the intermediate database.

Hence, it may be possible to improve upon (increase) the effective overlap between the user database and one or more of the other databases 141-149 using one or more intermediate databases. When this is the case, the user can be presented with the improved overlap value. For example, consider database A having key K1, database B having keys K1 and K2, and database C having key K2. The overlap of data entries between A and C will be determined as zero (see FIG. 15) despite the fact that some of the data entries in each may, in actuality, refer to the same person (or other "real-world" entity), because of the lack of matching keys. However, because B allows for key conversion from type K1 to K2 (and vice-versa), it may be possible to identify some of these people. For example, database A may have a 90% intersection with database B, and database B may have a 90% intersection with database C. In this case the intersection value presented to the use may be determined as the product of these values, i.e. 81%. This may be accompanied (on the GUI) with an indication that an intermediate database was used.

There may be circumstances where a dataset comprises multiple separate databases which form a group. As described in our GB Application No 1714655.6, groups may be formed statically or dynamically. It can be helpful in the context of determining intersections for such a group to 'appear' as a single dataset. One mechanism for achieving this is to use a hyperloglog mechanism. The key count of each database within the group can be represented with a set of hyperloglog registers, which can be combined to represent the group as a whole for the purpose of calculating an intersection with another dataset (or group) using the methods outlined above. In addition, the hyperloglog registers allow an approximate calculation of intersections to be accomplished, without having to create a complete model of the group when a new database is added or a new group is created. All that is needed is to generate hyperloglog registers for the new database, or combine existing hyperloglog registers differently to obtain an approximate, quick determination of an intersection.

The following describes in detail the techniques mentioned above by which two or more databases may be joined or queried.

FIG. 1 is a schematic diagram of a novel solution to address these issues. Reference numeral 12a denotes a first database (e.g. a database of a financial organisation) which holds certain attributes within its records (entries). Reference numeral 12c denotes a second database (e.g. a database of a retail organisation) which holds certain attributes within its records (entries). The attributes in one database may be different to the attributes in the other database. Some entities may exist in both databases, and the challenge is to combine knowledge from both databases by joining data in a fully privacy compliant way without any records leaving each company's data centre. Reference numeral 2 denotes a controller which provides such a data joining service. An example output graph visible to a user is denoted by reference number 3; in this example it provides information on the spending habit of customers categorised by their annual income.

Figure 2:
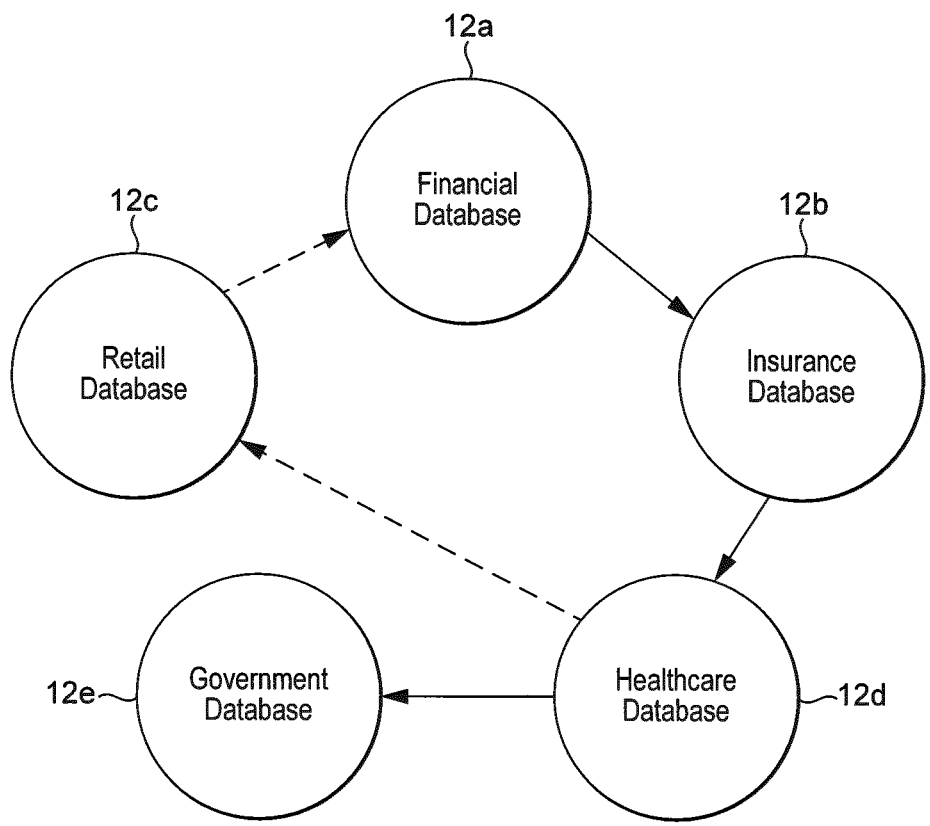
FIG. 2 is a diagram illustrating the method of data joining.

FIG. 2 shows schematically how data joining works for a data joining system with three organisations (Healthcare, Retail and Financial) shown by the dotted arrow, and for four organisations shown by bold arrows (Government, Healthcare, Insurance and Financial). In any case, queries can be created according to the existing datasets at each of the queried companies, in order to fully utilise all of the data available. A suitable filter, such as a list of hashes or Bloom filter, is created from a first query to be applied to one or more of the fields within each dataset to filter entries that does not correspond to a second query. Those matching entries in the dataset are then send back to the cloud as returned data. The joining of combined datasets creates greater knowledge than a single database can offer on its own and in some cases allow new datasets to be created. Common identifiers (or joining factors), such as email address and telephone number, are used to identify data associated with a particular entry across different datasets. In some cases different common joining factors may be use depend upon their availability in the target datasets. The final results as presented to the user can be originated from any one of the queried organisations, but each of the returned data can be configured to meet individual privacy/redaction policies.

Data joining as described herein may be employed to join internal data from databases belonging to the same entity, external data from databases owned by a plurality of entities, or data from databases physically located across different countries. For example when joining internal data, the data joining system according to examples described herein provides a solution to combine datasets that are not allowed to be cross-contaminated, or are intentionally segregated by access restrictions, internal policies and regulations. It is also useful for joining many internal databases that are too large to be managed in a single instance, or combine knowledge of different databases across a large corporation. When deployed to join external datasets, the data joining system allows the companies to benefit from pooling their knowledge and therefrom creates new datasets, as well as to acquire knowledge of sensitive data that would not normally be shared. Furthermore, the data joining system allows data to be sold into newly created market places. In some cases the use of the data joining system overcomes juridical restrictions and allows data to be exported from a particular jurisdiction. The data joining system is also useful for joining datasets that are time consuming to synchronise or technically impractical to move among different countries.

Databases which can be accessed using the data joining service form a data joining network. As more companies subscribe to the data joining network, they each form a node on the network and become a part of a combined dataset that incorporates many small datasets, e.g. the data joining network may act as a central database. Furthermore, there is no limit to the number or size of the combined datasets across the subscripting companies, whilst each of them remain in control of who they wish share their knowledge with.

Figure 3:
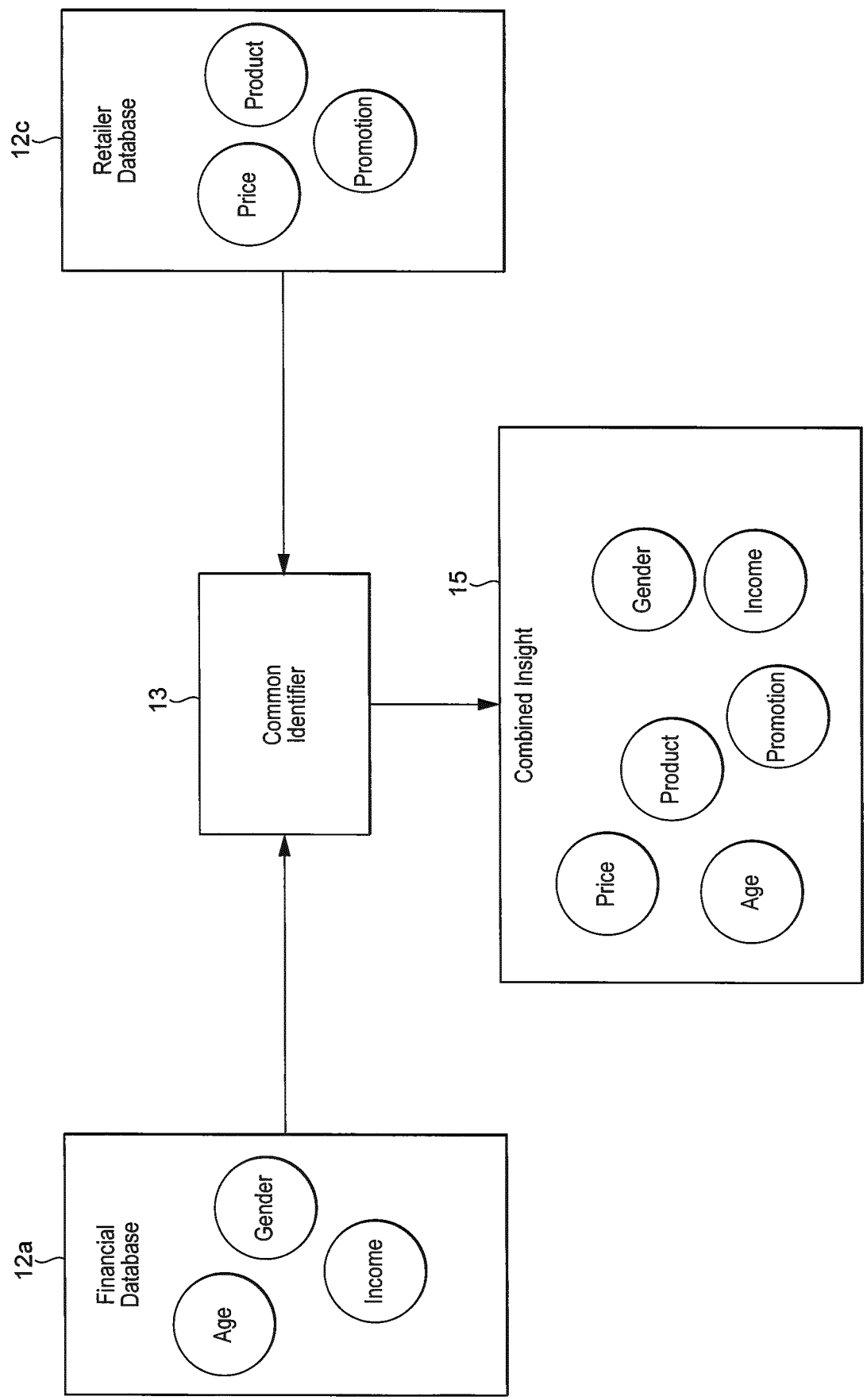
FIG. 3 is a schematic diagram illustrating a specific example where customers' transaction data is joined with their corresponding demographics data from two independently controlled databases.

FIG. 3 illustrates a specific example where a retailer cross-examines customers' transaction data and purchase history (e.g. price, product and promotion of past purchases) with their corresponding demographics data (e.g. age, gender and income) from a bank's dataset, using email addresses as a common identifier 13 (or joining factor). This provides a combined insight of customers 15 and allows the retailers to create bespoke promotion strategies for their target customers. For example, the combined dataset between the bank and the retailer reveals which promotions are used most frequently by different aged customers and based thereon tailor promotion strategy.

The novel solution offers a secure data sharing among different databases. In cases where the returned data is given in statistical form, customer records associated with the returned data never leave the owners' database. Moreover, the statistical data can comply with redaction rules to protect each individual customer's identity. Redaction control can be applied over the whole database or individual data fields.

The controller 2 can be embodied in the 'cloud' to provide a cloud service that facilitates data joining. The cloud service stores instructions for data acquisition (e.g. filtering expressions), but not the actual returned data. Moreover the queries can be controlled in real time and so they can be terminated as required.

In terms of access control, each sharing database is given its own set of access control so to allow bespoke control on who they wish share their knowledge with. This prevents accidental sharing of commercial sensitive data that would otherwise be detrimental to the owner of the sharing database. Restriction may also be imposed on queries requesting sensitive combination of fields in the dataset.

The described embodiments of the present invention allow data from multiple discrete databases to be combined, allowing different owners of databases to consent to mutual use of each other's data without compromising security of their own database or anonymity.

Figure 4:
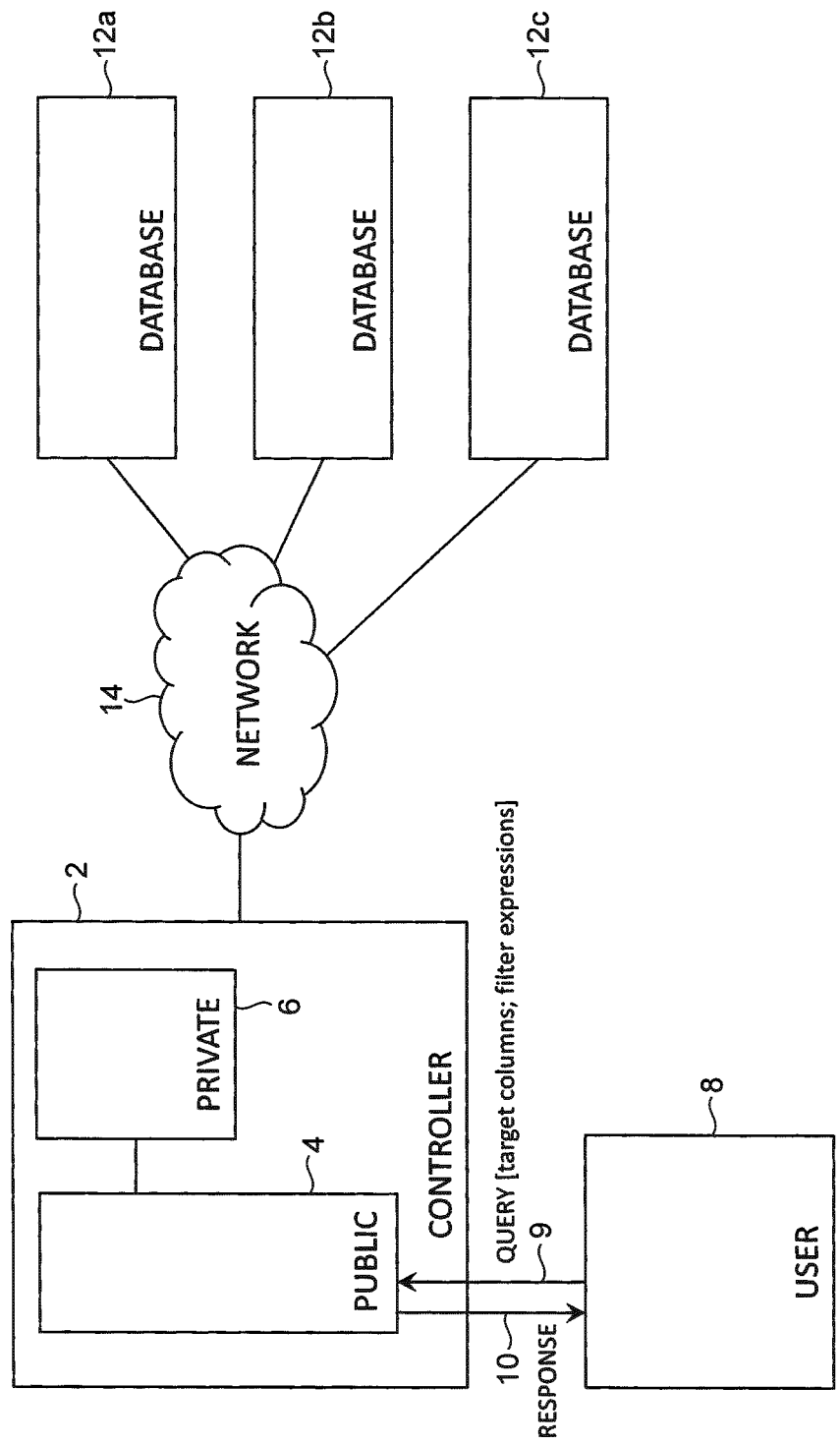
FIG. 4 is a schematic diagram illustrating a possible architecture for implementation of some embodiments.

FIG. 4 is a more detailed schematic block diagram of a system in which data from multiple discrete databases can be combined upon receiving a query from a querying user. The system comprises the central controller 2 which has a publically accessible component 4 and a set of private components 6 which implement a data combining process. The central controller can be implemented by software, firmware or hardware or any combination thereof. It could be a single server executing a computer program, or distributed over multiple servers, each running a load computer program, autonomously or in a distributed computing fashion. A user 8 has access to the controller 2 via a public interface, for example, which can be an application programming interface (API) in the controller 2. A user could be in contact with a controller 2 in any other way. Reference to a user herein refers to a user and/or a user device which can be any suitable computer device capable of generating and exchanging electronic messages. In particular, a user can generate a query 9 which he wants to run over multiple databases. That query can be generated by a human user providing manual input at an interface of a computer device, or it can be generated autonomously and automatically by a computer device itself.

Example queries are given later, together with examples of results of the queries delivered to the user.

The user 8 receives a response 10 following data combining processes carried out at the controller 2. The response 10 can take the form of a set of target entries resulting from combining the entries in the databases which satisfy expressions in the query. Alternatively, the response 10 can take the form of aggregated data as described in more detail herein, shown for example in a graphical format. The controller 2 is connected to multiple databases 12*a*, 12*b*, 12*c*. It can be connected via any suitable communication network 14, which could be a private Intranet or public Internet. Before going into a more detailed description of the architecture of the system, the basic principles of the data combining process will now be described. For this, reference is made to FIG. 5.

Figure 5:
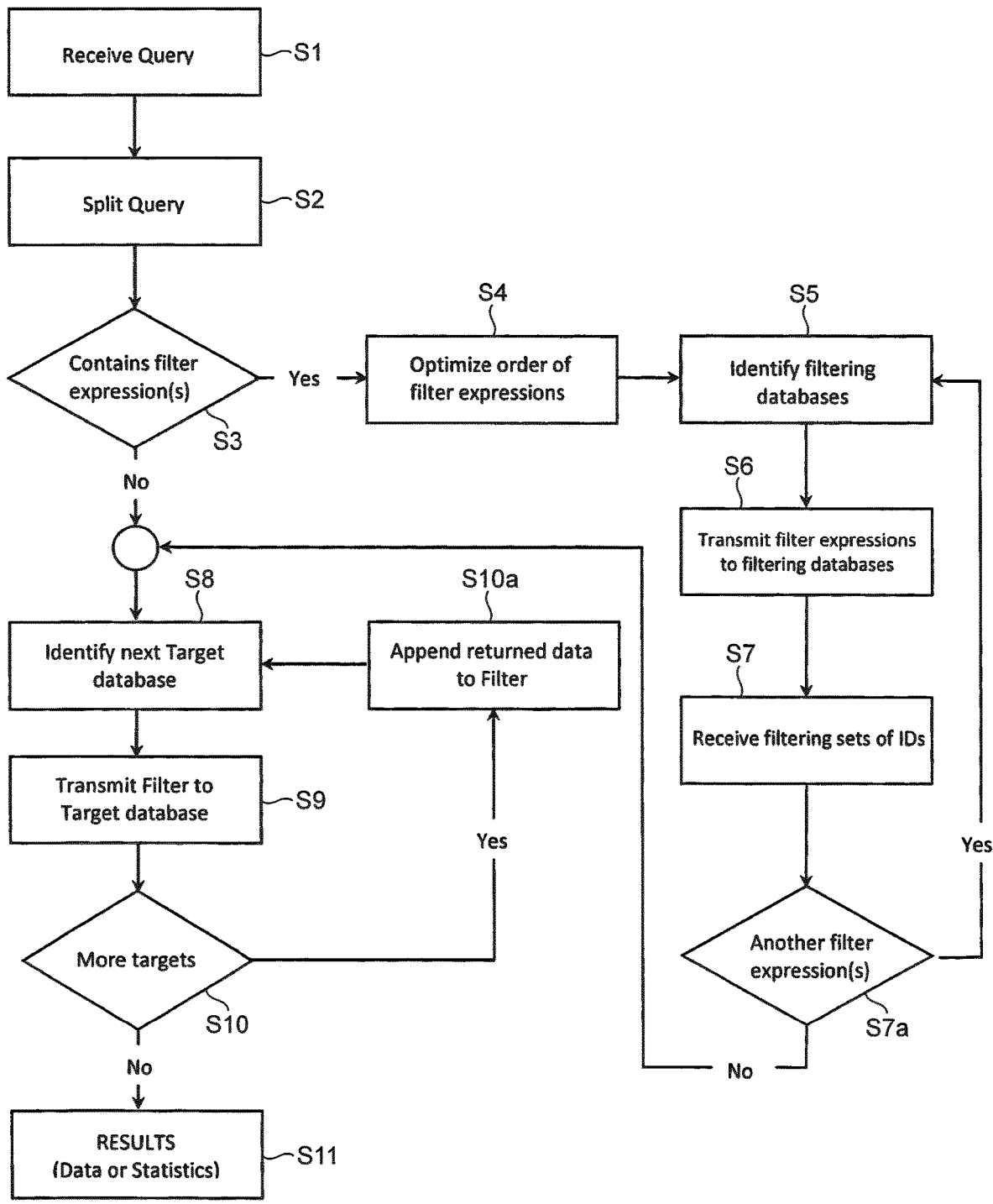
FIG. 5 is a flowchart illustrating processes carried out at a central controller.

As illustrated in FIG. 5, the first step of the process is the receipt of a query by the central controller 2 from the user 8, step S1. The query 9 comprises one or more target "columns" to receive data or statistics, and a set of filter expressions which the data or statistics should satisfy. For example, the query could ask for the number of data entries satisfying a certain age range and certain gender specification. Some examples are given later by way of illustration not limitation.

At step S2, the query is split into two queries, which are referred to herein as a filtering query and a target query. At step S3, a check is made to see whether or not the filter query contains filter expressions. If it does, the flow moves to step S4 where an order of the filter expressions is optimised. The purpose of this optimisation is to determine an order in which filter expressions are to be submitted to one or more database, as discussed in more detail later. At step S5 filtering databases are identified, each database being selected as the most appropriate database to deal with the particular filter expression. The central controller 2 stores information about all the databases to which it has access to allow it to identify appropriate filtering databases. This information is stored using a drone graph (44 in FIG. 7) described later. Each database is associated with a drone, which serves as a database agent on the software side. For example, the controller can identify which of the databases contains information related to the required filtering expression. At step S6, each filter expression is sent to the most appropriate database. When the first filter expression is sent to the first filtering database, it is run against the database to identify entries in that database matching the terms of the filter expression. For example, if the first required expression is an age range between 18 to 25, a filtering set of identifiers is returned from that database identifying database records satisfying the expression, for example, all the entities in the database aged between 18 to 25. Thus, the age range has produced a filtered set of identifiers. This filtered set can then be transmitted to a subsequent filtering database to act as a filter along with the next filter expression of the query, wherein the next filter expression is compared only to the entries in the database which satisfy the identifiers of the filtered set. Step S7 denotes the function of receiving the filtering sets of IDs, and step S7*a* the determination of whether there are additional filtering expressions. Once all filtering expressions have been utilised and run against their respective filtering databases, a final filtered ID set is produced. The process then moves to step S8 where a target database is identified for execution of the target query. For example, the target query in this case could be gender-based, for example, identify all females. In step S9, the filtered dataset and the target query are applied to the identified target database where the target query is run only against the identifiers which satisfy the identifiers in the filtered dataset. Note that a single filter expression can be sent to multiple databases, or multiple filter expressions can be sent to a single database. Note also, that in some cases there may be no filtering expressions (step S3) in which case the target query is just passed straight to one or more target database. It is important to recognise that no data records are transferred, only record IDs.

Note that there may be more than one target database, as well as or instead of, multiple filtering databases. Thus, a database could both produce a result set of record data and a filtering set of identifiers for a subsequent query. Note that one expression may be run against multiple databases, for example when more than one database satisfies the expression, but perhaps with incomplete records.

Step S10 checks for whether there are any more target queries or more target databases that need to be addressed with the target query and in the case that they are, the returned data is appended to the filter S10*a* and steps S8 and S9 run again on the next target database.

When all target databases have been queried, the final results are returned in step S11. Note that the results may be actual data entries, or aggregated statistics, depending on the context in which the method is applied. For example, "real data" could be provided in the results in a company internal implementation, while aggregated statistical results could be provided for public usage, for reasons of security and anonymity.

Figure 6:
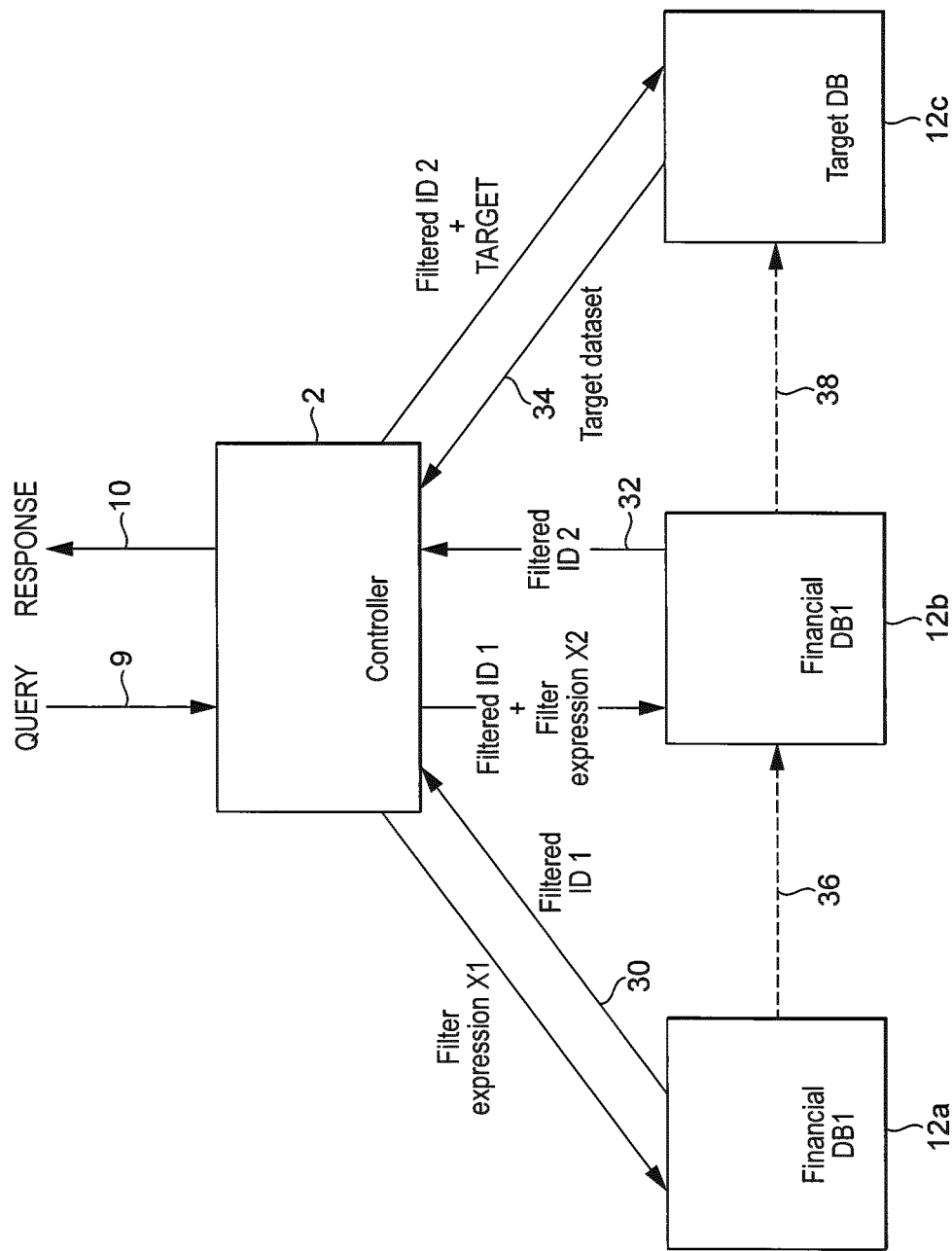
FIG. 6 is a schematic diagram illustrating the flow of FIG. 5.

FIG. 6 is a schematic architectural diagram which gives one example of the flow described with reference to FIG. 5. As shown in FIG. 6, a query 9 is received at the controller 2. In this case, the controller 2 splits the query into three separate queries, a first query with a first filter expression X1, a second query with a second filter expression X2, and a third target query with a target expression TARGET. As an example, the first filter expression could be an age range (e.g. between 18 to 25), the second filter expression could be income (e.g. more than £60,000) and the target expression could be gender (i.e. all females). The first query with the first filter expression X1 is sent to the first database 12*a* of a financial organisation labelled Financial DB1. This database is determined by the controller as being the best database for establishing data entries fitting a certain age range. A filtered set of IDs 1, 30, is returned to the controller 2. This filtered ID set includes record identifiers or records from the filter database Financial DB1 satisfying the first filter expression (that is, all data entries fitting the age range between 18 to 25). The filtered ID set 1 can comprise a list of hashed identifiers, where each identifies a data entry in the database, or can be a bloom filter or the like.

A bloom filter is commonly applied to test whether an element (e.g. one of the identifiers) is a member of a set. The set is a list of all identifiers and each identifier identifies one or more rows, which might be the database. More specifically, a bloom filter tests whether an element is certainly not present and therefore remove the need to seek elements that don't exist in a set. A query returns a result of either "possibly in set" or "definitely not in set". A bloom filter is particularly useful if the amount of source data would require an impractically large amount of memory if "conventional" error-free hashing techniques were applied.

Moreover, the original used list of hashes cannot be generated from the filter, so it provides another level of anonymity.

The filtered ID set 1 and the second query with the second filter expression X2 is then addressed to the second database 12b of another financial organisation labelled Financial DB2. This database has been identified by the controller as being a good database for extracting income-related data.

The query which is run over the second filter database is a query which matches the second filter expression X2 against only those database entries identified by the filtered ID set 1. This is therefore potentially a faster query to run and might reduce the amount of data to transfer. Moreover, note that there has been no requirement to "join" the records of the first and second filter databases into a common dataset. Thus, these databases can be completely independent, logically and/or geographically and do not have to have any common control or ownership. Note also that no raw data (database records) is expected.

A second filter ID set 2, 32, is returned to the controller 2 following the query which is run on the second filtering database Financial DB2 12b. The controller 2 sends the second filter ID set 2 and the target expression to a target database which it has identified. The result 34 of running the target expression TARGET against the identifiers in the filter dataset 2 (or the bloom filter) is returned to the controller 2. The controller 2 provides the response 10 to the user, which is either raw data or aggregated data as discussed herein.

As an alternative architectural possibility, the first filter ID set 1, 30 and the second filter ID set 2, 32 do not need to be returned to the controller. Instead, they could be passed directly from the first filter database to the second filter database, and from the second filter database to the target database respectively as indicated schematically by the dotted line arrows 36 and 38 moving to the right in FIG. 6.

Figure 7:
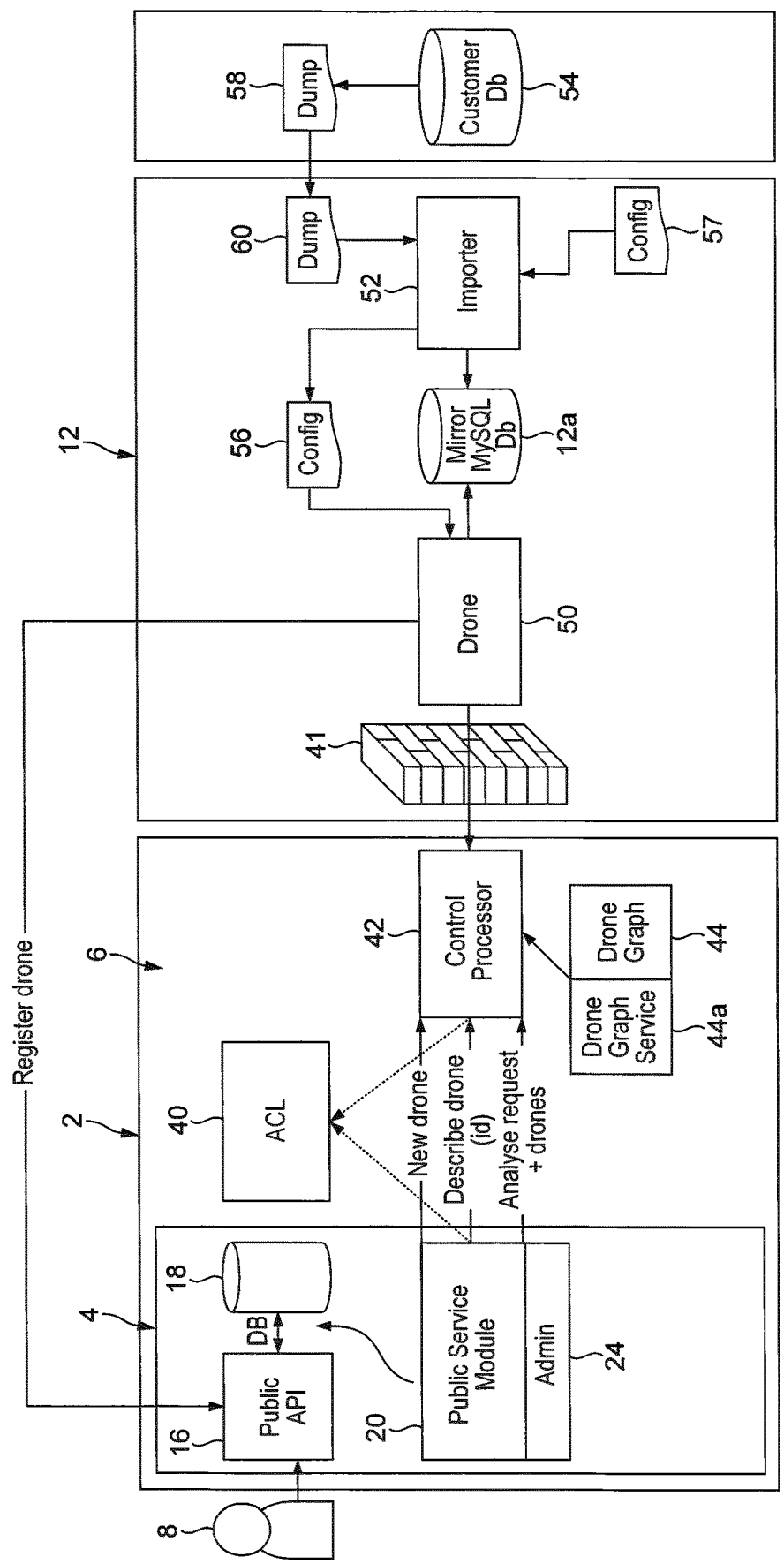
FIG. 7 is a more detailed architectural diagram of a computer system for accessing multiple independent databases.

FIG. 7 is a more detailed architectural diagram illustrating the component at the controller 2 and at a database site 12. The term "database site" is used herein to denote any site where one or more databases may be located. A database may alternatively be referred to herein as a "customer site", indicating that the database is owned by a particular customer. One distinct advantage of the described embodiments is that searches may be done across multiple databases which may be individually owned by different customers. One such database site is shown in FIG. 7. The public part 4 of the controller 2 comprises a public API 16 which is connected to a database 18 and to a public service module 20 which provides an administration interface 24.

The public API enables the user 8 to interact with the system. The administrator interface interact with an access central layer (ACL) components to set up permission, etc. for individual users.

Public parts 4 of the controller communicate with private components within the private part 6. The private components comprise the Access Control Layer (ACL) component 40, and a control processor 42. The access control layer 40 conditions outgoing requests according to the redaction policies of the querying customer and their subscription status. The processor component 42 is responsible for the processing functions which have been described, and for communication with database sites 12. Each database site comprises a firewall 41 for security purposes. The database site 12 incorporates a database 12a (one of the databases that has already been described). The database 12a is associated with a database agent or drone 50 which is the component which acts to facilitate receipt of queries from the controller 2 and the execution of running those queries over the database 12a.

The database site 12 shown in FIG. 7 has a single database and a single drone. However, there may be a plurality of drones provided for a particular site, each associated with a distinct database. In the present embodiment, there is a 1:1 relationship between drones and databases. The database site 12 comprises an importer module 52. The importer module 52 plays the role of importing data from a "raw" customer database 54 into the database 12a, against which queries can be run. A configuration file 57 can be provided for controlling the operation of the importer. For the sake of completeness, reference numeral 58 denotes a database dump received from the customer database 54, and reference numeral 60 denotes the transfer of that database dump into the database site 12 so that it can be provided to the importer module 52. The configuration file which is supplied to the importer can be manually generated or automatically generated. It defines in particular a set of identifiers which are to be used by the database 12a such that all databases against which queries can be run have at least one common identifiers. This could, for example, be personal information such as a name or email address. In addition, certain items of data to populate the data entries may be required by the configuration file. The importer module 52 supplies a configuration file 56 to the drone 50 to inform the drone about the structure of the database 12a against which queries can be run. An example of the configuration file 56 is given in FIG. 7a.

User requests are handled through the public API via the public service module 20 to the control processor 42. The message "analyse request+drones" in FIG. 7 denotes a request from a user to analyse an input query and to identify the appropriate drones to which the split queries should be sent. New drones can be added by the administration interface 24 of the public service module 20. The drone registration process is described below.

Figure 16:
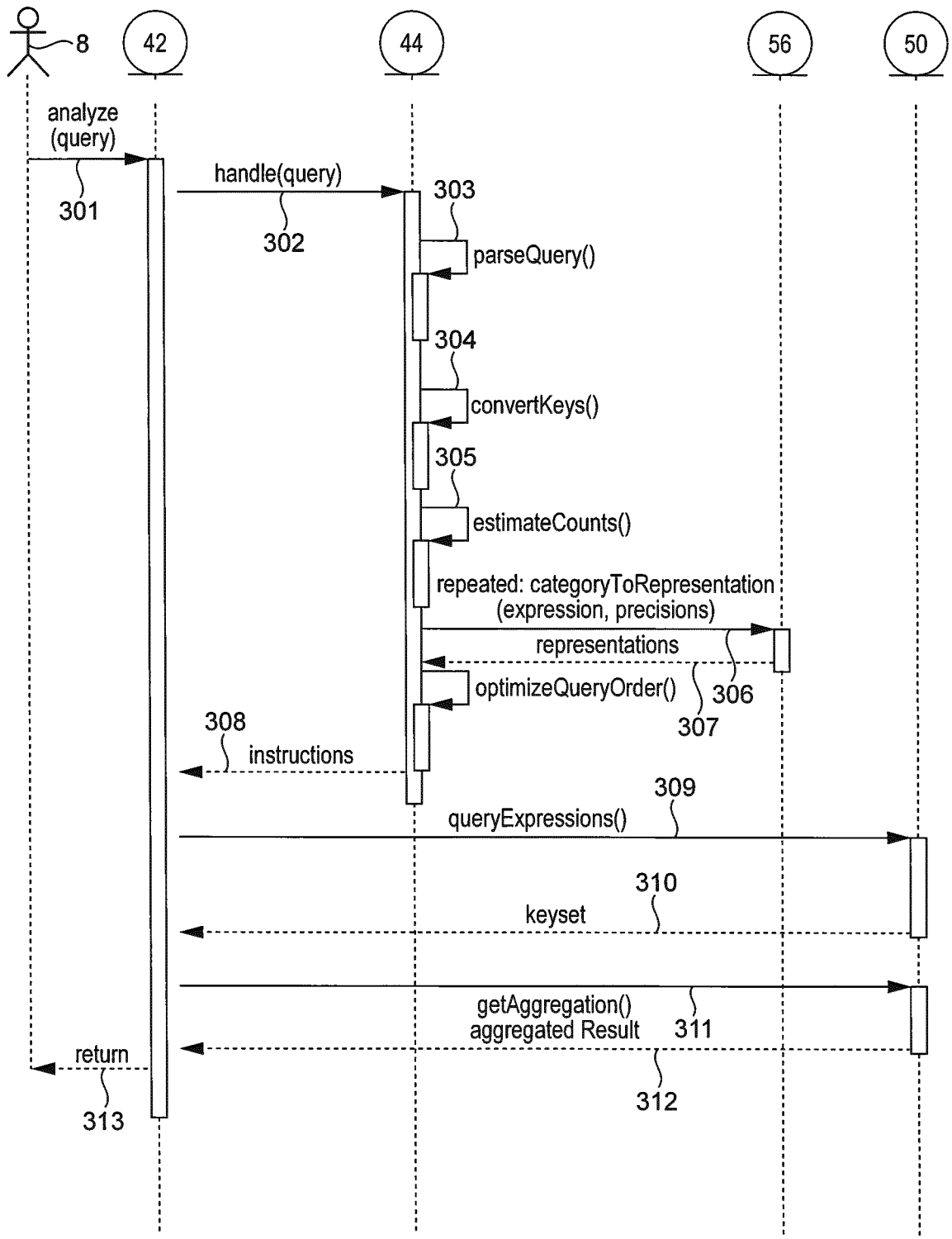
FIG. 16 shows an example overall system architecture.

FIG. 16 shows a diagram illustrating an overview of the flow within the system architecture for applying a query to multiple datasets to return a result. This puts the inventive aspects described in the present application into a broader use context. For example, to run a query for salary data for people aged 41 and above (e.g. salary:age>40): a first dataset having age values but no salary data can be used to identify names (as an example of a key) of people who are older than 40; these names are then provided to a second dataset having salary data but not age values in order to return the salary data of those people previously identified using the first dataset (who are therefore over 40).

The datasets used (the multiple datasets above) can be determined based on intersection data between datasets. For example, respective indications of intersections between a user's dataset and each of a plurality of further datasets may be determined.

A higher intersection means it is more likely that a given entry, as identified by a key such as name, is present in both datasets (i.e. that a given entry from the user's dataset is in the respective further dataset). A further dataset having a higher intersection with the user's dataset than another dataset therefore contains more data entries with keys matching a key from the user's dataset than the other dataset. Therefore, the intersection value(s) may be presented to the user 8 for the user to select which dataset(s) he wishes to run his query over. Alternatively, a dataset pair having the highest intersection may be automatically selected.

The query is input, for example by the user 8 entering the query via the public API 16 and received by the control processor 42 with a request 301 to analyse the query. The input query is then analysed to determine one or more datasets to which the query should be applied. This involves analysing the expressions of the query in order to determine at least one dataset having relevant data (e.g. an expression "age>40" requires a dataset comprising age data).

The analysed query is then passed to a drone graph service 44a with a request 302 to handle the query. The drone graph service 44a comprises the drone graph 44 enabled with some processing functionality. That is, the drone graph service 44a comprises the drone graph 44 and a processor (not shown) for performing operations on the drone graph 44 (e.g. create, read, update, delete operations) including at least those described herein.

The drone graph service 44a parses the query —303 (this may be performed by a dedicated parser separate from the processor). After parsing the query, the drone graph 44 itself is used by the processor of the drone graph service 44a to convert 304 keys of one dataset into a type recognisable by the other dataset (e.g. if the first dataset uses names of people and the second dataset uses email addresses, then an intermediate mapping entity storing associations between names and email addresses is used to either convert names to email addresses of vice versa).

The drone graph service 44a then estimates 305 the size of the query based on statistical data about the datasets (e.g. percentiles of numeric values, most common values for text or Boolean values etc.).

In step 306, data categories in the query are analysed by the drone graph service 44a to optimise a match between a representation of that category in the query and an available representation in the dataset. The dataset may store data of a particular category according to more than one representation. That is, the configuration file 56 of a particular drone may specify multiple representations of a data value in a certain category, to enable better matching with an input query. The representations which are available are returned 307 to the drone graph service 44a. The drone graph service 44a selects which representation is to be used based on maximising an expected returned query size. At step 308, the drone graph service 44a returns instructions to the control processor 42 to use the selected representation.

The query is then run over this pair of datasets by the control processor 42 using the representation indicated in the instructions of step 308. The first dataset is accessed 309 (represented here by drone 50) using an expression of the query (e.g. age>40) to generate a set of keys ("keyset") being the keys which represent data entries satisfying the expression (e.g. a set of names of people aged over 40 in the first dataset).

This keyset is returned 310 by the drone 50 to the control processor 42 which then provides 311 the keyset and the querying expression to the second dataset (also represented by drone 50 in FIG. 16) to aggregate data entries from the second data set. This comprises the drone of the second dataset determining entries of the second dataset having keys which match a key of the keyset and aggregating the values according to the querying expression. For example, the querying expression may be for salary data in which case the drone 50 aggregates salary data for those people in the second dataset who are identified in the keyset provided in step 311. The result (e.g. salary data for people over 40 years of age) is then returned 312 to the control processor 42 which can then provide 313 the result to the user 8.

Drone Registration Process

When a new database is to be added to the system, a new drone 50 is initiated at the location (e.g. customer site) of the database. An administrator at the controller 2 manually instigates a new drone registration process which contacts the new drone to cause the new drone to issue a registration request. The administrator adds a drone and gets a JWT (text) and supplies this text to someone who uses this text at the customer site 12. When the drone starts it sends a request including the JWT to the public API 16. On success the response contains a certificate which the drone needs for communication between 42 and 50, and a drone identifier. Drone identifiers are held in a graph 44 at the controller 2. The list can be made accessible to customer with access constraints. The drone identifier identifies the drone and its location address to enable queries to be sent to it. Each drone has an association with its database at the customer site. The drone ID also indicates the attributes available to be searched in the database associated with that drone.

As mentioned above, in the response that is returned to a requesting user, the raw set of data entries which have been identified as a result of the multiple queries executed across multiple databases may be returned. Alternatively, the entries can be aggregated into groups according to attributes of the entries. For example, the groups could comprise statistical bins, each bin containing result entries with attributes in a defined parameter range for that attribute. The aggregated data is supplied to a user.

To increase anonymization (that is to decrease the likelihood of a particular data entry in a sparse set being able to be tied to a particular individual who could be identified) a redaction threshold can be applied of a minimum number of entries per bin. Another redaction threshold for entries in all bins could also or alternatively be applied, e.g. "small" bins can be removed.

As mentioned above, the embodiments described herein enable results across a number of different databases to be returned in response to a single query, in a manner which is "hidden" from a requesting user. Moreover, there is no need to join the records of the databases into a common dataset, so there is no requirement for the databases to be under any kind of common control or ownership.

The databases may be at separate geographical locations. The databases may be at separate IP addresses.

Figure 8A:
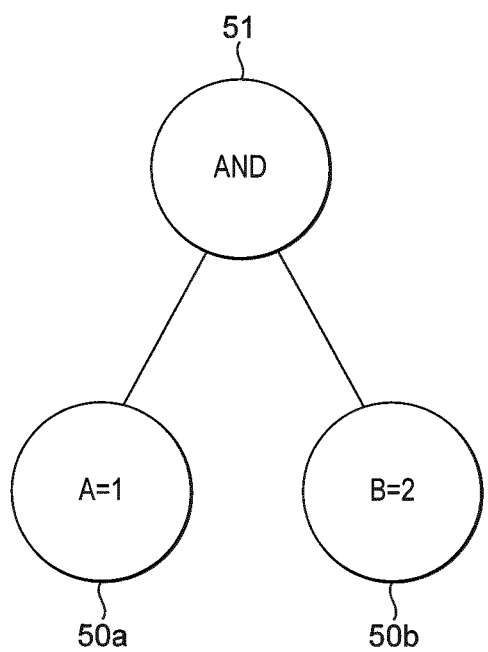
FIG. 8*a* and FIG. 8*b* are diagrams illustrating filtering expressions with logical operators.
Figure 8B:
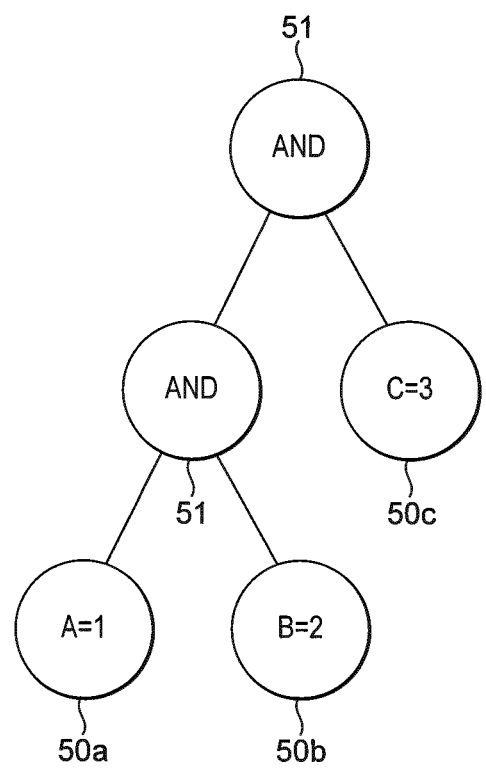
Figure 9:
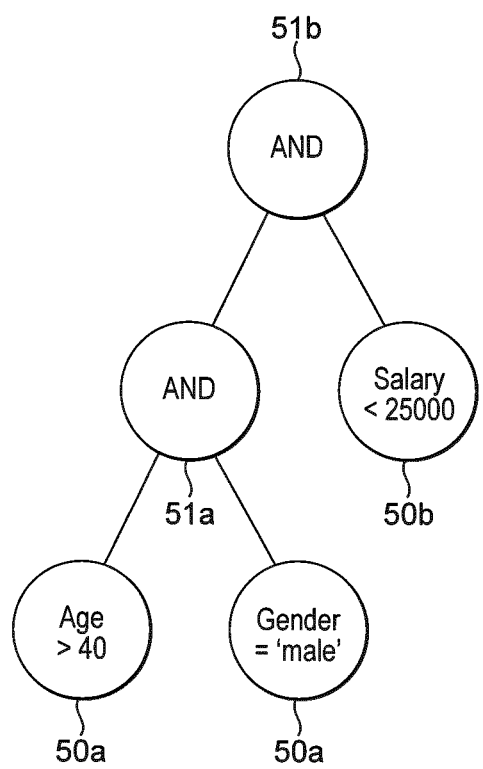
FIG. 9 is a diagram illustrating the process of querying multiple drones with a single joining key.
Figure 10:
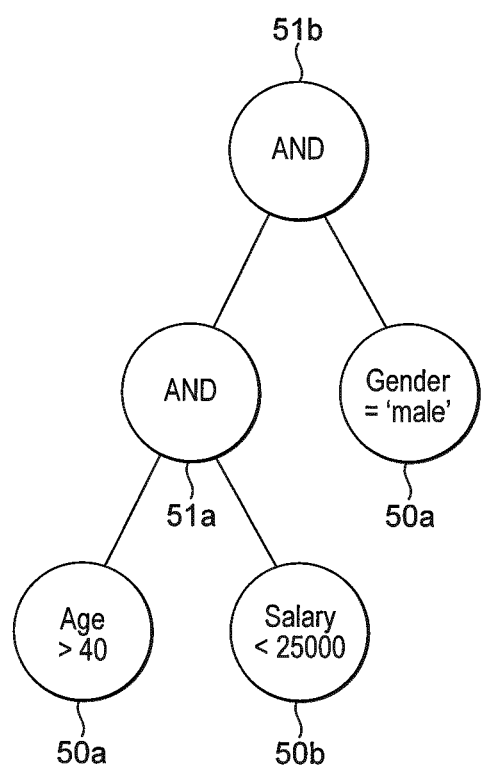
FIG. 10 is a diagram illustrating the process of querying multiple drones with a single joining key.

FIG. 8 to FIG. 10 exemplifies the process of querying multiple drones using a single joining key. For example, a combination of filtering expressions A=1 AND B=2 is shown in FIG. 8a to illustrate the use of an "AND" operator 51 for cross examining returned results at the drones 50a, 50b. Wherein an extra filter expression C=3 at drone 50c can be added and the filtering expressions may be represented as a tree in FIG. 8b, i.e. A=1 AND B=2 AND C=3. Each of the drones 50a, 50b and 50c is appropriated with a respective independent database.

In FIG. 9, the expressions A, B and C in FIG. 11b are replaced with actual filtering expressions (Age>40), (Gender="male") and (salary<25000). In this particular example, drone 50a contains both age and gender information and drone 50b contains salary information. Since the filtering expressions (Age>40) and (Gender="male") are both operable using a common operator (AND) 51a at drone 50a, they can be operated using a single query ("age>40 and gender="male").

In a first scenario where neither drones 50a nor 50b is the target drone, they both count the number of entries fitting their respective filtering expression, as follow, Count ("age>40 and gender="male") in drone 50a; and Count ("salary<25000") in drone 50b;

Assuming the count is relatively lower in drone 50*a* than that in drone 50*b*, the two drones then carry out filtering and each returns a filtering set, as follow, Query ("age>40 and gender="male") in drone 50*a* and return filtering ID set S1; and Query ("salary<25000" and filtering set ID set 1) in drone 50*b* and return filtering ID set S2 which returns a filtering ID set S2 at most the same amount of elements than in the filtering ID set S1.;

The return filtering ID set S2, which has a higher count, is then sent to the target drone for generating the distribution.

In a second scenario where drone 50*b* is the target drone, no counting is required at the drones 50*a* and 50*b*, since drone 50*b* will be used to generate the distribution, e.g. the operation comprising the step of Query ("age>40 and gender="male") in drone 50*a* to return filtering set S1, and subsequently sending filtering expression ("salary<25000") and said filtering set S1 to drone 50*b* to generate the distribution.

A third scenario is shown in FIG. 10 where the scenario (A+B) and C is changed to (A+C) and B. The query comprises the filtering expression to "(Age>40 and gender='male') and salary<25000". The process is equivalent to that of the first scenario.

Example queries have the following form:
Target expression WHERE filter expression.

Figure 11:
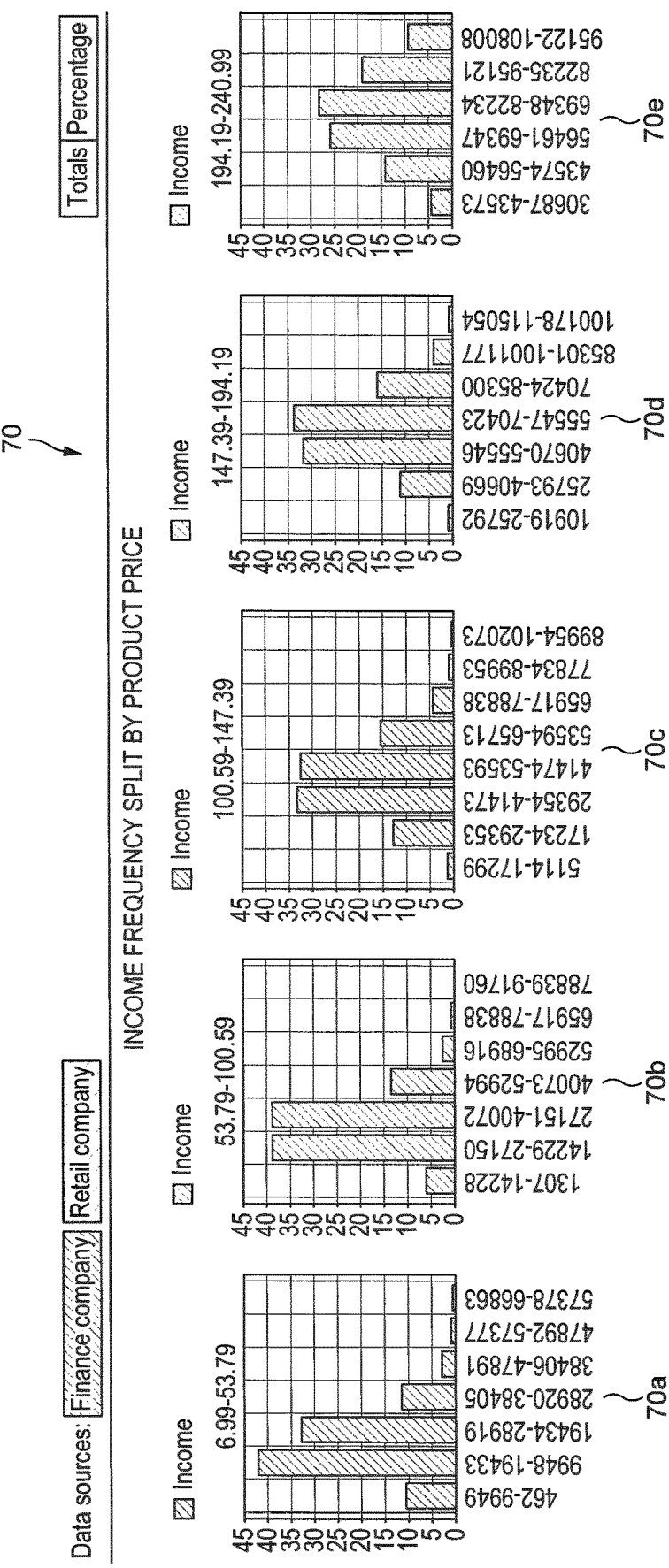
FIG. 11 shows an example output of a user screen.

FIG. 11 shows an example output of a user screen 70 for a user which has requested to join data from a finance company and a retail company.

The query Q1 underlying this is:
Distribution (Income) WHERE Distribution (Product Price)

The data shown in the bar graphs 70*a*-70*e* in FIG. 11 is income data which shows the number of people having income in certain ranges derived from a finance company. The numerical range on each bar graph differs and represents a product price range derived from the retail company.

Figure 12:
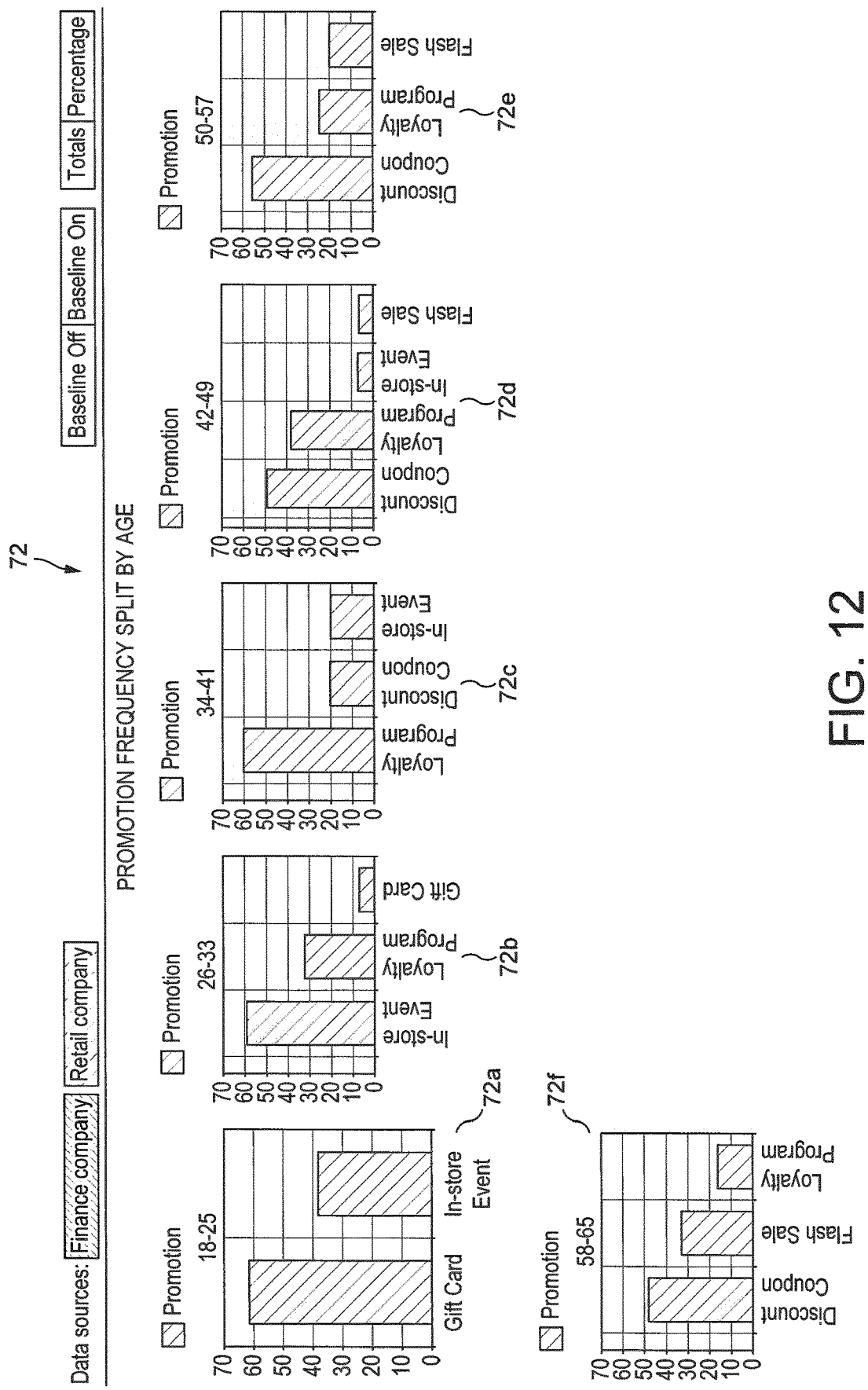
FIG. 12 shows another example output of a user screen.

FIG. 12 shows another example. In this example the data from the finance company indicates numbers of people in certain age range with certain income bracket, which is used to provide different bar graphs 72*a*-70*f* from the retail company concerning promotion types.

The query Q2 underlying this is:
Distribution (Promotion) WHERE (Distribution (Age) WHERE income>60000)

Figure 13:
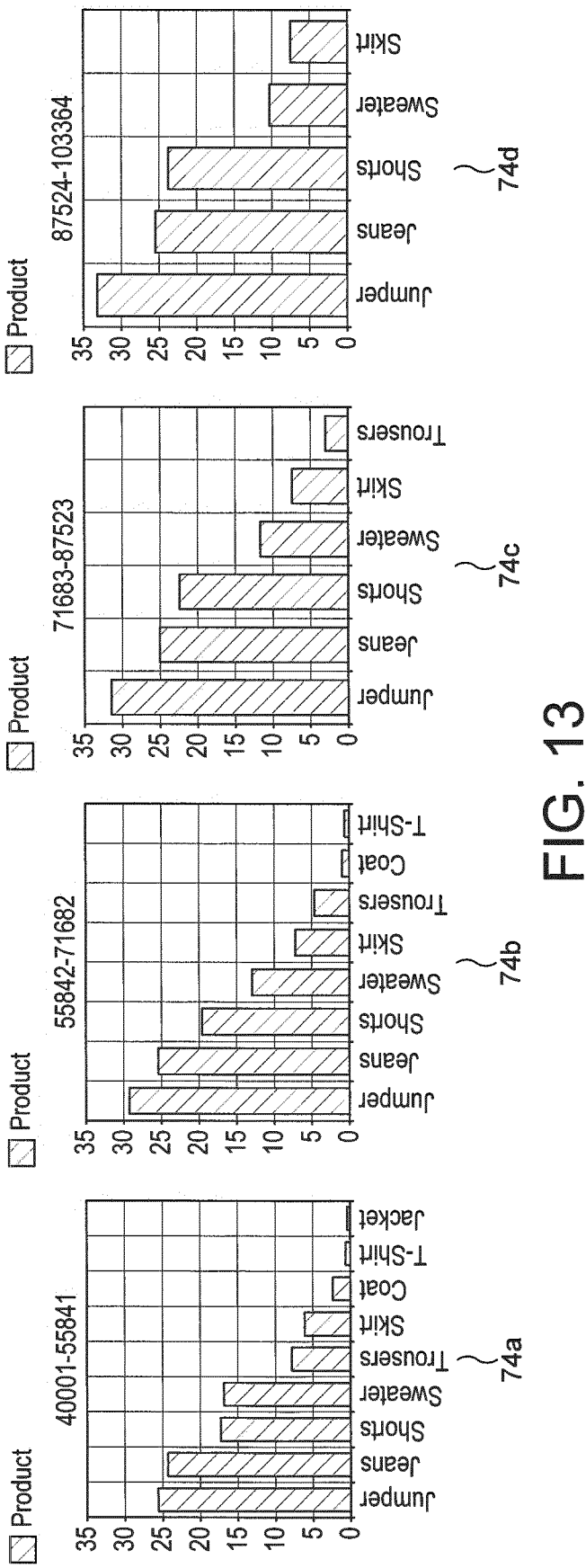
FIG. 13 shows yet another example output of a user screen.

FIG. 13 shows another example where the data from the finance company is used to provide income ranges which are used to generate bar graphs 74*a*-70*d* of product frequency from the retail company.

The query Q3 underlying this is:
Distribution (Product) WHERE (Distribution (income) WHERE income>40000 and product_price>80)

Some examples of filter expressions and their use are illustrated in the following table.

| Filter expression | Example use |
| --- | --- |
| Operator (>, >=, =, !=, <, <=) | age >40, Age >=40, town = "London" |
| Operator between | age between 25 and 30, town between 'a' and 'b' |
| Operator in | age in (15, 16, 24, 25), postcode in ('RG21 1CE', 'RG21 1CD') |
| Operator like | postcode like 'RG21 %' |
| Negated | Not age >40 |
| Combined via AND | age >40 and age >50, town > 'a' and town < 'b' |
| Combined via OR | age >60 or age <15 |

These example filter expressions may be applied to form the following example queries:

distribution(income) where (distribution(gender) where (distribution (age) where job_status !='unemployed')), represents "how is income distributed over genders and ages for not unemployed people".

distribution (private_health_insurance) where (distribution(age) where (distribution(visits_to_doctor) where age>50 and (income>45000 or retired=true))), represents "how many people have a private health insurance when they are over 50 and earn more than £45000 or are retired" The results are split up into 2 groups that is "age" and "visits_to_doctor" group".

sum(purchases) where (distribution(purchase_method) where (distribution(town) where (distribution)purchase_month and purchase_time>'28-10-2015') where age between 18 and 29 and gender='female", represents "how much money have young females spend on purchases split up in the towns they live in, the month they made the purchase, and the method they used in the last 12 months".

As mentioned above, the importer module 52 defines the identifiers which will be used in common between the databases. Although it may be desirable to have identifiers which uniquely identify particular entries, it is not necessary for implementation of the concept described herein. It is anticipated that there may be errors where identifiers do not uniquely identify an individual entry, for example, customers having the same first and last names, or a single customer having multiple email addresses. However, error rates in aggregation may be acceptable in some cases. If error rates are not acceptable, mechanisms could be put in place to improve the accuracy, or to triage the identifiers to make sure they are unique.

It is noted that different customer databases may adopt different column headers for the same expression, therefore the importer module can be arranged to carry out normalisation on the column headers so as to produce a unified category (or identifier) for a given expression. The normalised data are exported from the "normal" database 54 to the database 12*a* against which queries will be run, the database 12*a* constituting an intermediate recipient database for the purpose of running the queries. It is possible to share high level data statistics between the databases once normalisation is finished, or while the database is being normalised. Normalisation can be carried out manually or automatically.

The invention claimed is:

1. A method of determining a further dataset to be joined with a source dataset, the method comprising:
receiving via a computer interface an identifier of a source dataset stored at one or more memory devices, the source dataset comprising a plurality of data entries each identified by a respective key;
using a processor to determine an intersection weight between the source dataset and each of a plurality of possible further datasets by accessing a data structure holding, for each pair of possible further datasets and the source dataset, a pre-calculated intersection weight based on the number of common keys between the source dataset and the respective possible further dataset, the number of common keys between the source dataset and one of the plurality of possible further datasets being a number or percentage of data entries in the source dataset for which the keys of the source dataset match keys of entries in that one of the plurality of possible further datasets;

using the processor to generate an output based on the intersection weights for use in selecting, one of the plurality of possible further datasets to be joined with the source dataset;
providing a selection of one of the plurality of possible further datasets to be joined with the source dataset, wherein said providing a selection comprises:
receiving via the computer interface user input selecting one of the datasets, based on the intersection weights; or
the processor automatically selecting the possible further dataset which has the highest respective intersection weight with the source dataset,
joining the source dataset and the selected further dataset; and
applying a query to the source dataset and the selected further dataset.

2. The method according to claim 1, wherein the output which is generated causes the possible further datasets to be presented to the user via a graphical user interface.

3. The method according to claim 2, wherein the possible further datasets are presented to the user on the GUI ranked according to their intersection weight with the source dataset.

4. The method of claim 1, wherein determining an intersection weight comprises the processor accessing the, for each of the plurality of datasets, data indicative of a set of keys comprised in the respective dataset, and calculating the intersection weight from the sets of keys.

5. The method according to claim 1, further comprising receiving via the computer interface a filtering category and selecting from the plurality of possible further datasets a subset having data entries of a category which matches the filtering category.

6. The method according to claim 5, wherein said determining is performed only for the subset of datasets.

7. The method according to claim 5, wherein the filtering category is received from a user.

8. A method according to claim 1, wherein the identifier of the source dataset is received via the computer interface from a human user, and wherein the generated output enables a step of selecting to be carried out by the human user.

9. The method according to claim 1, wherein the identifier of the source dataset is received via the computer interface from a human user, and wherein the generated output enables a step of selecting to be carried out automatically without input from a user.

10. The method according to claim 1, wherein the identifier of the source dataset is received via the computer interface from an autonomous agent supplying the query, and the step of selecting is carried out automatically.

11. The method according to claim 1, wherein the source dataset stores entries identified by a key of a first type; and wherein the intersection weight between the source dataset and at least one of the plurality of datasets storing entries identified by a key of the second type and not of the first type is determined using an intermediate dataset to convert the key of the first type to a key of the second type.

12. A computer program product comprising a tangible computer-readable medium storing computer code which when executed by a computer carries out the method according to claim 1.

13. A method of determining a further dataset to be joined with a source dataset, the method comprising:
receiving via a computer interface an identifier of a source dataset stored at one or more memory devices, the source dataset comprising a plurality of data entries each identified by a respective key;
using a processor to determine an intersection weight between the source dataset and each of a plurality of possible further datasets by accessing a data structure holding, for each pair of possible further datasets and the source dataset, a pre-calculated intersection weight based on the number of common keys between the source dataset and the respective possible further dataset, the number of common keys between the source dataset and one of the plurality of possible further datasets being a number or percentage of data entries in the source dataset for which the keys of the source dataset match keys of entries in that one of the plurality of possible further datasets;
using the processor to generate an output based on the intersection weights for use in selecting, one of the plurality of possible further datasets to be joined with the source dataset;
providing a selection of one of the plurality of possible further datasets to be joined with the source dataset, wherein said providing a selection comprises:
receiving via the computer interface user input selecting one of the datasets, based on the intersection weights; or
the processor automatically selecting the possible further dataset which has the highest respective intersection weight with the source dataset,
wherein determining an intersection weight comprises the processor accessing, for each of the plurality of datasets, respective data indicative of a set of keys comprised in the respective dataset, and calculating the intersection weight from the respective data, each respective data being either a respective bloom filter or hyperloglog structure generated from keys included in the respective dataset, and wherein the step of determining the intersection weight for a given possible further dataset is performed by generating a source bloom filter or hyperloglog structure from keys comprised in the source dataset and comparing the source bloom filter with the respective bloom filter or hyperloglog structure of that dataset.

14. A computer system for identifying datasets to be joined, the computer system comprising:
a computer interface for receiving an identifier of a source dataset stored at one or more memory devices, the source dataset comprising a plurality of data entries each identified by a respective key;
a hardware processor configured to execute a computer program which:
determines an intersection weight between the source dataset and each of a plurality of possible further datasets by accessing a data structure holding, for each pair of possible further datasets and the source dataset, a pre-calculated intersection weight based on the number of common keys between the source dataset and the respective possible further dataset, the number of common keys between the source dataset and one of the plurality of possible further datasets being a number or percentage of data entries in the source dataset for which the keys of the source dataset match keys of entries in that one of the plurality of possible further datasets; and
an output for providing an output signal based on the intersection weights for use in selecting one of the plurality of possible further datasets to be joined with the source dataset;

wherein the computer program executed by the processor provides a selection of one of the plurality of possible further datasets to be joined with the source dataset;

wherein said providing a selection comprises:
  receiving via the computer interface user input selecting one of the datasets, based on the intersection weights; or the processor automatically selecting the possible further dataset which has the highest respective intersection weight with the source dataset, wherein the computer program further applies a query to the source dataset and the selected further dataset.

* * * * *